(12) United States Patent
Oh

(10) Patent No.: US 12,729,733 B2
(45) Date of Patent: Sep. 8, 2026

(54) ACTUATOR FOR VEHICLE BRAKE

(71) Applicant: HYUNDAI MOBIS Co., Ltd., Seoul (KR)

(72) Inventor: Byeong Jun Oh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 505 days.

(21) Appl. No.: 18/088,023

(22) Filed: Dec. 23, 2022

(65) Prior Publication Data

US 2023/0358285 A1 Nov. 9, 2023

(30) Foreign Application Priority Data

May 3, 2022 (KR) ........................ 10-2022-0054719

(51) Int. Cl.

*F16D 65/18* (2006.01)
*B60T 13/74* (2006.01)
*F16D 121/24* (2012.01)
*F16D 125/52* (2012.01)

(52) U.S. Cl.

CPC .......... *F16D 65/183* (2013.01); *B60T 13/741* (2013.01); *F16D 2121/24* (2013.01); *F16D 2125/52* (2013.01)

(58) Field of Classification Search

CPC ............... F16D 65/183; F16D 2121/24; F16D 2125/52; B60T 13/741

See application file for complete search history.

(56) References Cited

U.S. PATENT DOCUMENTS 6,513,398 B1 * 2/2003 Finkemeyer ............. H02K 7/06 74/427
9,879,759 B1 * 1/2018 Mauro .................... F16H 55/22
2003/0034196 A1 * 2/2003 Shimizu .................. F16H 55/22 180/444
2021/0016758 A1 * 1/2021 Choi ..................... F16D 65/568

FOREIGN PATENT DOCUMENTS

KR 10-1041553 B1 6/2011

* cited by examiner

*Primary Examiner* — David R Morris
(74) *Attorney, Agent, or Firm* — Morgan, Lewis & Bockius LLP

(57) ABSTRACT

An actuator for a vehicle brake includes a first worm shaft connected to a motor and disposed within a housing, a first worm wheel disposed within the housing, engaged with the first worm shaft, and rotated in conjunction with the rotation of the first worm shaft, a second worm shaft including a second worm shaft body disposed within the housing and connected to the first worm wheel and a plurality of second worm shaft gear teeth disposed on the outer circumference of the second worm shaft body in a way to be spaced apart from each other, and a second worm wheel engaged with the second worm shaft and configured to deliver electric power to a piston part that pressurizes or releases a brake.

16 Claims, 19 Drawing Sheets

ACTUATOR FOR VEHICLE BRAKE

CROSS-REFERENCE TO RELATED APPLICATION

This application claims the benefit under 35 U.S.C. § 119(a) of Korean Patent Application No. 10-2022-0054719, filed on May 3, 2022 in the Korean Intellectual Property Office, the entire disclosure of which is incorporated herein by reference for all purposes.

BACKGROUND

Technical Field

Exemplary embodiments of the present disclosure relate to an actuator for a vehicle brake, and more particularly, to an actuator for a vehicle brake, which can withstand a heavy load upon operation and can be mass produced because the actuator can be manufactured as a mold.

Discussion of the Background

In general, in an electronic parking brake (EPB) of a vehicle, an actuator pressurizes a piston by converting rotatory power of a drive motor into a rectilinear motion by using a screw and nut mechanism along with a gear module part. The pressurized piston generates braking power by compressing a brake pad, that is, a friction material, against a wheel disk.

A gear module part of the actuator that is applied to a conventional EPB includes a worm shaft connected to the shaft of a drive motor and a worm wheel engaged and coupled to the worm shaft. In this case, a crossed helical gear, that is, a gear in which a cross section of the gear of a worm shaft is flat has a problem in that it has low stiffness due to a point contact with the gear of the worm wheel. Furthermore, if the gear of the worm shaft has a double-headed drum shape, the gear has high stiffness, but has a problem in that it is difficult to mass produce the gear because it is difficult to manufacture the gear as a mold. Accordingly, there is a need for improving such a problem.

The Background of the present disclosure is disclosed in Korean Patent No. 10-1041553 (entitled "ELECTRIC PARKING BRAKE ACTUATOR ASSEMBLY" issued on Jun. 8, 2011).

SUMMARY

Various embodiments are directed to providing an actuator for a vehicle brake, which can withstand a heavy load upon operation and can be mass produced because the actuator can be manufactured as a mold.

In an embodiment, an actuator for a vehicle brake includes a housing, a first worm shaft connected to a motor and disposed within the housing, a first worm wheel disposed within the housing, engaged with the first worm shaft, and rotated in conjunction with a rotation of the first worm shaft, a second worm shaft that includes: a second worm shaft body disposed within the housing and connected to the first worm wheel, and a plurality of second worm shaft gear teeth disposed on an outer circumference of the second worm shaft body in a way to be spaced apart from each other, the plurality of second worm shaft gear teeth include: second worm shaft enveloping gear teeth, each having an external diameter that is increased from a worm shaft central part of the second worm shaft body toward a first end of the second worm shaft body, and second worm shaft cylindrical gear teeth, each having a constant external diameter from the worm shaft central part to a second end of the second worm shaft body, and a second worm wheel engaged with the second worm shaft and configured to deliver electric power to a piston part that pressurizes or releases a brake.

In an embodiment of the present disclosure, at least one of the second worm shaft enveloping gear teeth may be disposed on a first side on the second worm shaft body, the first side approaches the second worm wheel in response to the second worm shaft being rotated in a direction in which the second worm shaft generates braking power.

In an embodiment of the present disclosure, at least one of the second worm shaft cylindrical gear teeth may be disposed on a second side on the second worm shaft body, the second side becomes distant from the second worm wheel in response to the second worm shaft being rotated in the direction in which the second worm shaft generates the braking power, and the first and second sides may oppose each other on a basis of the worm shaft central part.

In an embodiment of the present disclosure, the actuator may further include a bearing disposed within the housing and configured to support a rotation of the second worm shaft.

In an embodiment of the present disclosure, the at least one of the second worm shaft enveloping gear teeth may be disposed closer to the first worm wheel than the at least one of the second worm shaft cylindrical gear teeth, and the bearing may be disposed between the first worm wheel and the at least one of the second worm shaft enveloping gear teeth.

In an embodiment of the present disclosure, the at least one of the second worm shaft enveloping gear teeth may be disposed further from the first worm wheel than the at least one of the second worm shaft cylindrical gear teeth, and the bearing may be disposed further from the first worm wheel than from the at least one of the second worm shaft enveloping gear teeth.

In an embodiment of the present disclosure, in response to the second worm shaft being rotated in a direction in which the second worm shaft generates braking power, at least one of the second worm shaft enveloping gear teeth may be disposed on a third side on the second worm shaft body, the third side is one in which the second worm shaft applies a force greater than a force applied to at least one of the second worm shaft cylindrical gear teeth.

In an embodiment of the present disclosure, in response to the second worm shaft being rotated in a direction in which the second worm shaft releases the braking power, the at least one of the second worm shaft cylindrical gear teeth may be disposed on a fourth side on the second worm shaft body, the fourth side is one in which the second worm shaft applies a force greater than a force applied to the at least one of the second worm shaft enveloping gear teeth, and the third and fourth sides oppose each other on a basis of the worm shaft central part.

In an embodiment of the present disclosure, the second worm wheel may include: a second worm wheel body rotatably installed in the housing; and a plurality of second worm wheel gear teeth disposed along an outer circumference of the second worm wheel body in a way to be spaced apart from each other, the second worm wheel gear teeth may include: a second worm wheel enveloping gear tooth may include a second worm wheel inclined part having a protrusion height increased from a central part of the second worm wheel gear tooth toward a first end of the second worm wheel gear tooth, and a second worm wheel cylindrical gear tooth having a constant protrusion height from the central part to a second end of the second worm wheel gear tooth.

In an embodiment of the present disclosure, the second end of the second worm wheel gear tooth may be an end opposite the first end of the second worm wheel gear tooth.

In another embodiment, an actuator for a vehicle brake includes a housing, a first worm shaft connected to a motor and disposed within the housing, a first worm wheel disposed within the housing, engaged with the first worm shaft, and rotated in conjunction with a rotation of the first worm shaft, a second worm shaft that includes: a second worm shaft body disposed within the housing and connected to the first worm wheel, and a plurality of second worm shaft gear teeth disposed on an outer circumference of the second worm shaft body in a way to be spaced apart from each other, the plurality of second worm shaft gear teeth may include: second worm shaft enveloping gear teeth, each having an external diameter that is increased from a worm shaft central part of the second worm shaft body toward a first end of the second worm shaft body, and second worm shaft cylindrical gear teeth, each having a constant external diameter from the worm shaft central part to a second end which is a side opposite to the first end, a second worm wheel engaged with the second worm shaft and configured to deliver electric power to a piston part that pressurizes or releases a brake.

In an embodiment of the present disclosure, the actuator may further include a bearing disposed within the housing and configured to support a rotation of the second worm shaft.

In an embodiment of the present disclosure, at least one of the second worm shaft enveloping gear teeth may be disposed closer to the first worm wheel than at least one of the second worm shaft cylindrical gear teeth, and the bearing may be disposed between the first worm wheel and the at least one of the second worm shaft enveloping gear teeth.

In an embodiment of the present disclosure, at least one of the second worm shaft enveloping gear teeth may be disposed further from the first worm wheel than at least one of the second worm shaft cylindrical gear teeth, and the bearing may be disposed further from the first worm wheel than from the at least one of the second worm shaft enveloping gear teeth.

In an embodiment of the present disclosure, the second worm wheel may include: a second worm wheel body rotatably installed in the housing; and a plurality of second worm wheel gear teeth disposed along an outer circumference of the second worm wheel body in a way to be spaced apart from each other, the second worm wheel gear teeth may include a second worm wheel enveloping gear tooth may include a second worm wheel inclined part having a protrusion height increased from a central part of the second worm wheel gear tooth toward a first end of the second worm wheel gear tooth, and a second worm wheel cylindrical gear tooth having a constant protrusion height from the central part to a second end of the second worm wheel gear tooth.

In the actuator for a vehicle brake according to an embodiment of the present disclosure, the second worm shaft gear teeth of the second worm shaft include the second worm shaft enveloping gear teeth having widths increased from the worm shaft central part of the second worm shaft body toward the first end. Accordingly, damage to the second worm shaft and the second worm wheel can be prevented because the stiffness of the second worm shaft and the second worm wheel is increased upon surface contact with the second worm wheel, and mass production is possible because the second worm wheel can be manufactured as a mold.

Furthermore, the present disclosure has effects in that the gear tooth of the worm shaft part does not have low strength compared to a conventional technology in which the second worm shaft gear tooth has a double-headed drum shape because the second worm shaft gear tooth has a half-headed drum shape, noise is a lot generated due to a low engagement rate, and efficiency of a work is high and a cost can be reduced due to a simple manufacturing process.

Furthermore, according to embodiments of the present disclosure, since at least any one of the first worm wheel and the second worm wheel includes the plurality of gear teeth including the enveloping gear teeth and the helical gear teeth, the worm wheel can withstand a heavy load because the first worm shaft and the second worm shaft come into surface contact with each other upon operation. Accordingly, damage to the worm shaft can be prevented because the stiffness of the worm wheel and the worm shaft is increased, and mass production is possible because the worm wheel can be manufactured as a mold.

DETAILED DESCRIPTION OF THE ILLUSTRATED EMBODIMENTS

Figure 1:
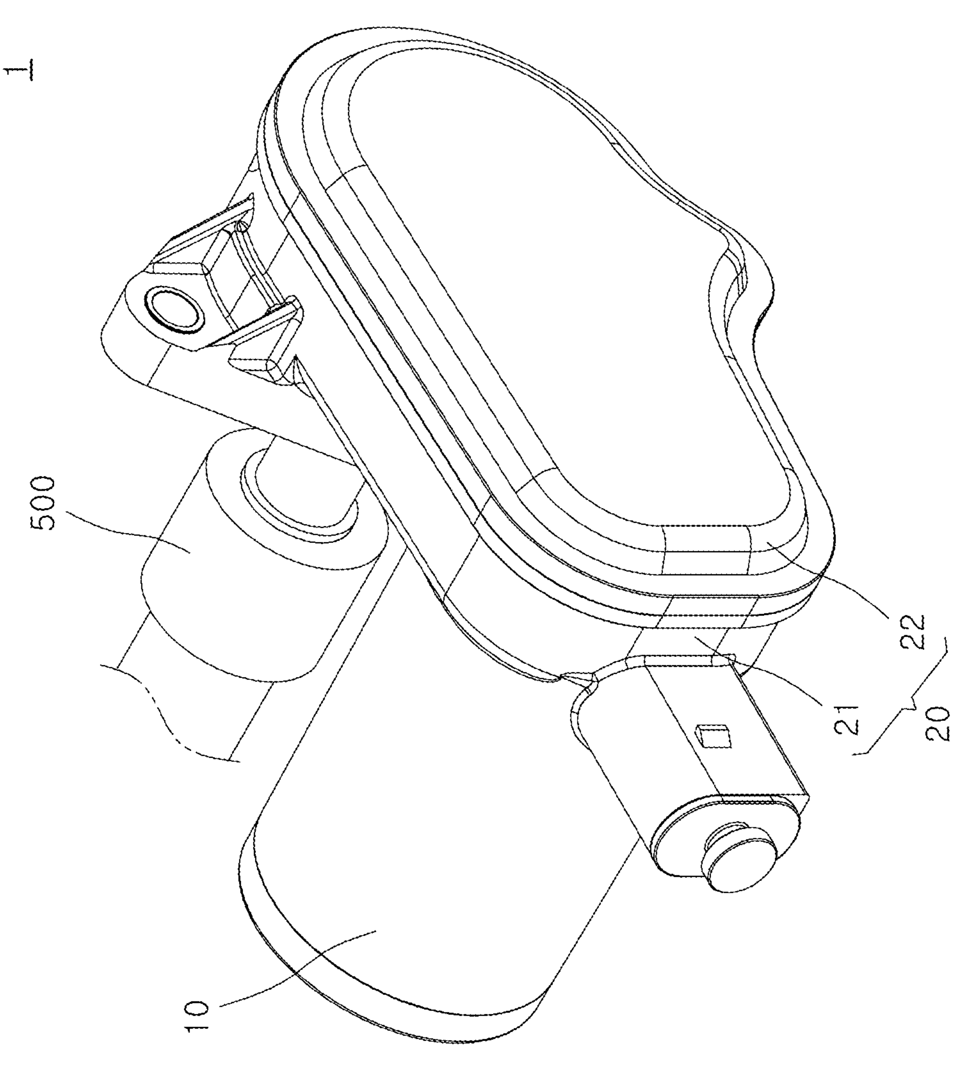
FIG. 1 is a diagram schematically illustrating an actuator for a vehicle brake according to an embodiment of the present disclosure.

Hereinafter, an actuator for a vehicle brake according to an embodiment of the present disclosure will be described below with reference to the accompanying drawings through various exemplary embodiments.

In this process, the thicknesses of lines or the sizes of elements illustrated in the drawings may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

Figure 2:
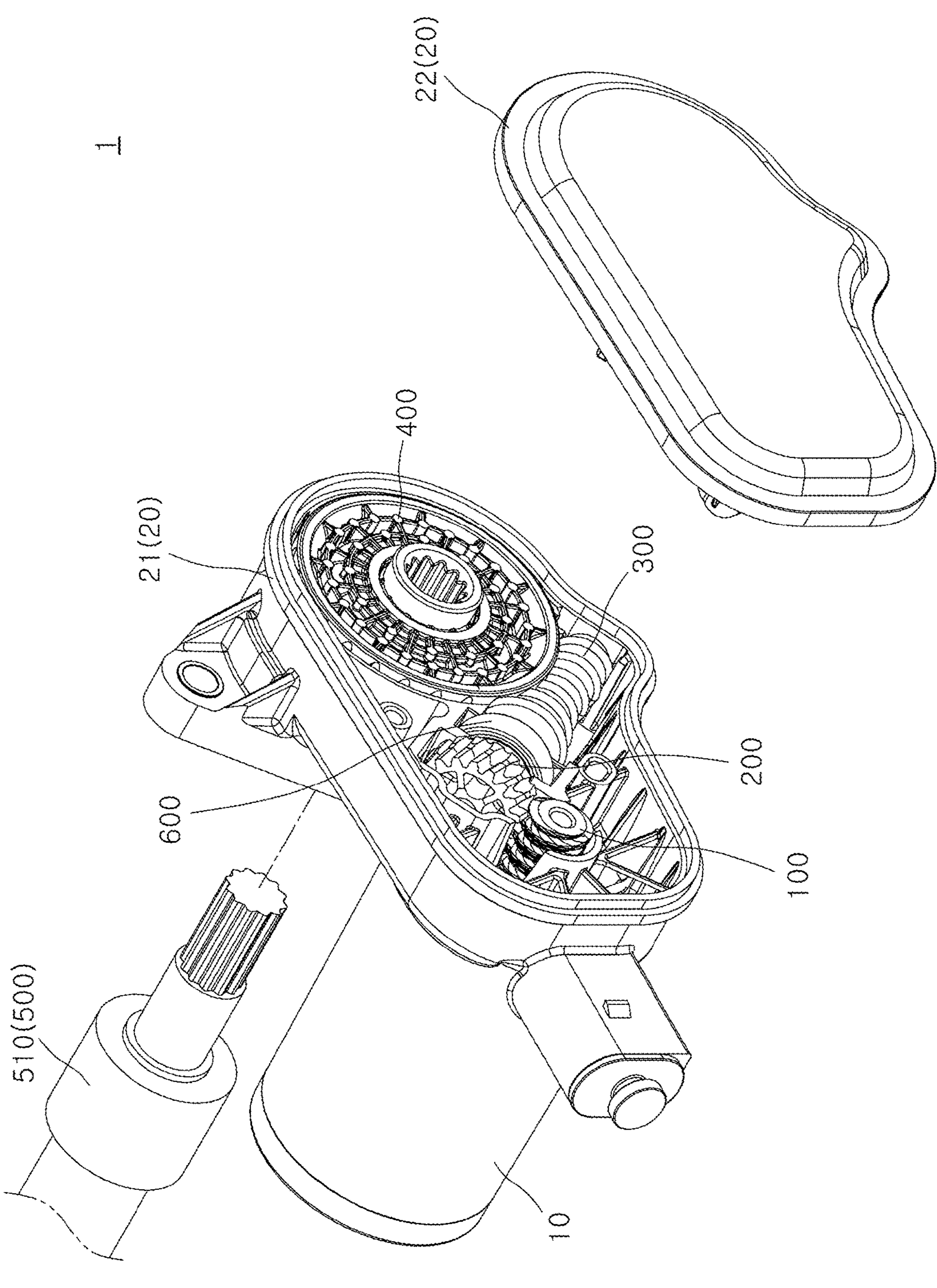
FIG. 2 is an exploded perspective view of the actuator for a vehicle brake according to an embodiment of the present disclosure.
Figure 3:
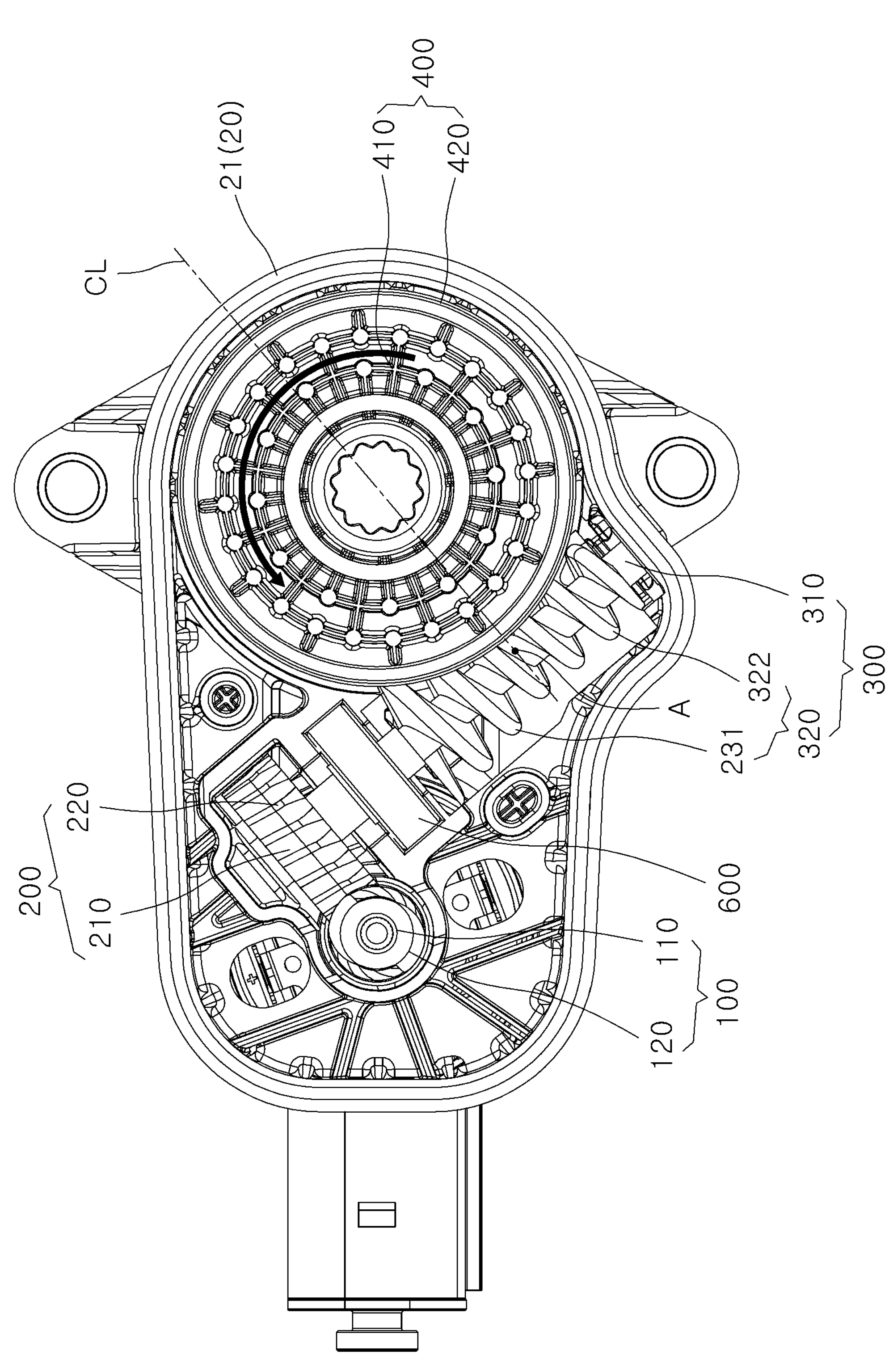
FIG. 3 is a front view of the actuator for a vehicle brake according to an embodiment of the present disclosure.
Figure 4:
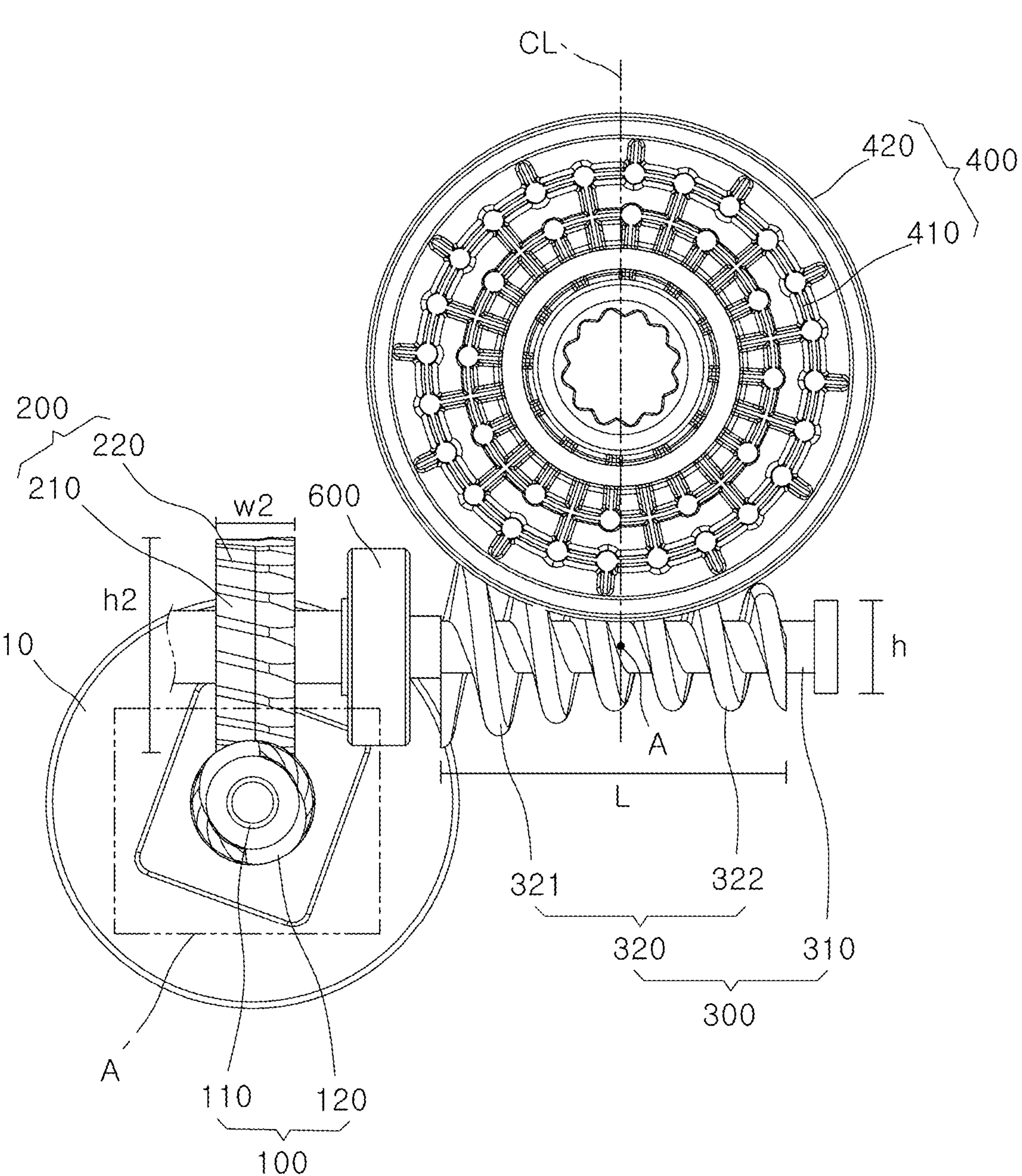
FIG. 4 is a front view illustrating that a part of the actuator for a vehicle brake according to an embodiment of the present disclosure has been omitted.
Figure 5:
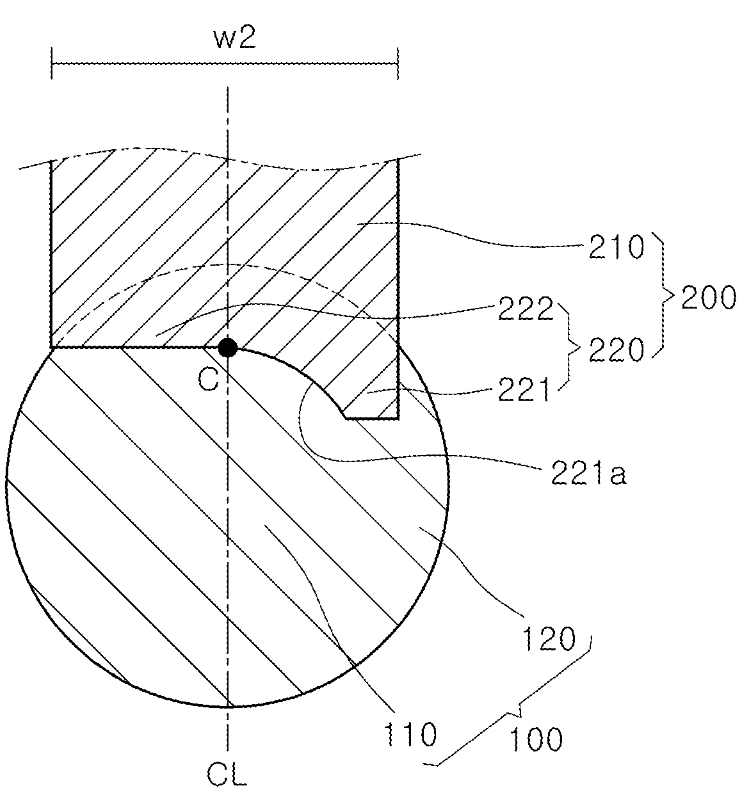
FIG. 5 is a cross-sectional view of a portion A in FIG. 4.
Figure 6:
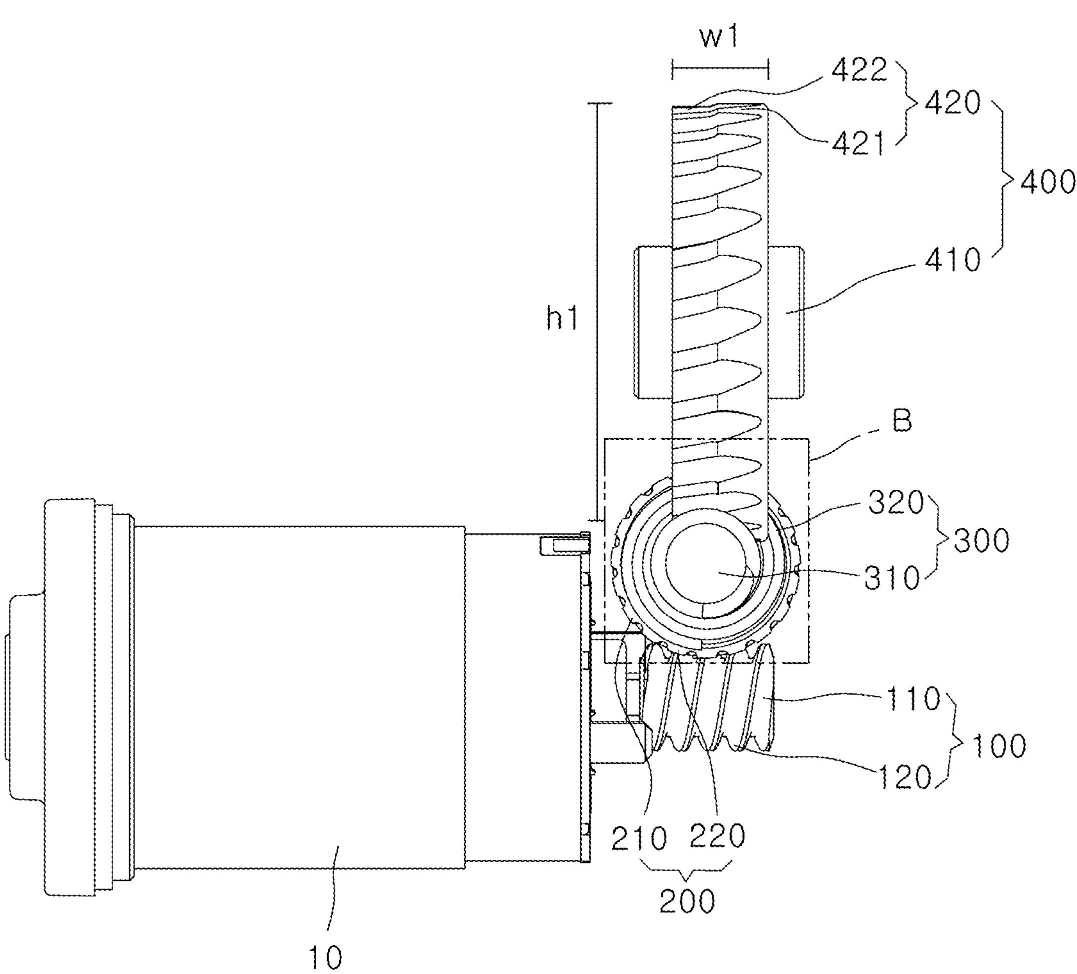
FIG. 6 is a diagram of FIG. 4, which is viewed in another direction.
Figure 7:
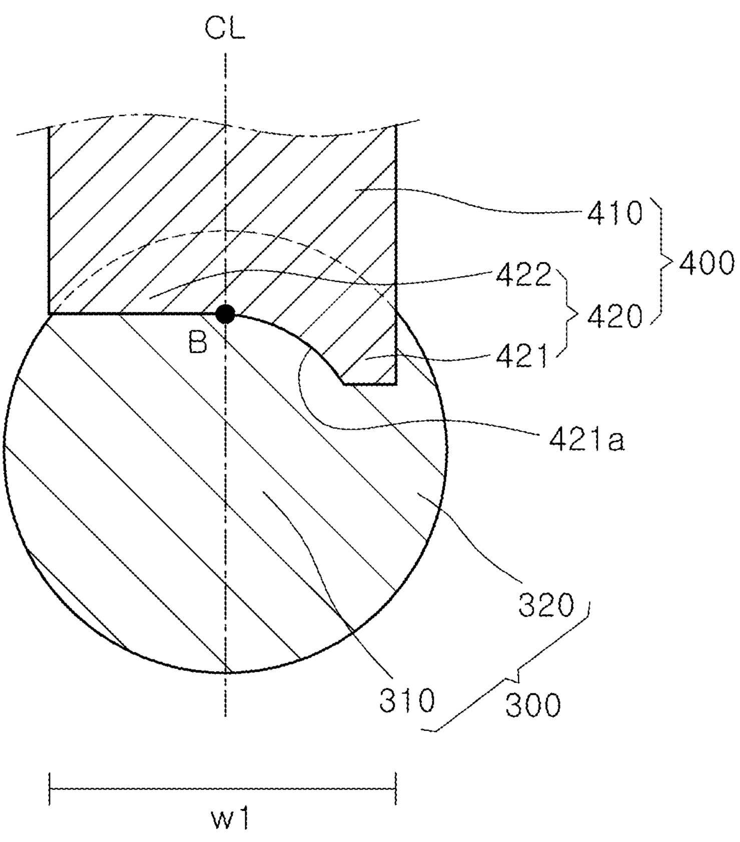
FIG. 7 is a cross-sectional view of a portion B in FIG. 6.
Figure 8:
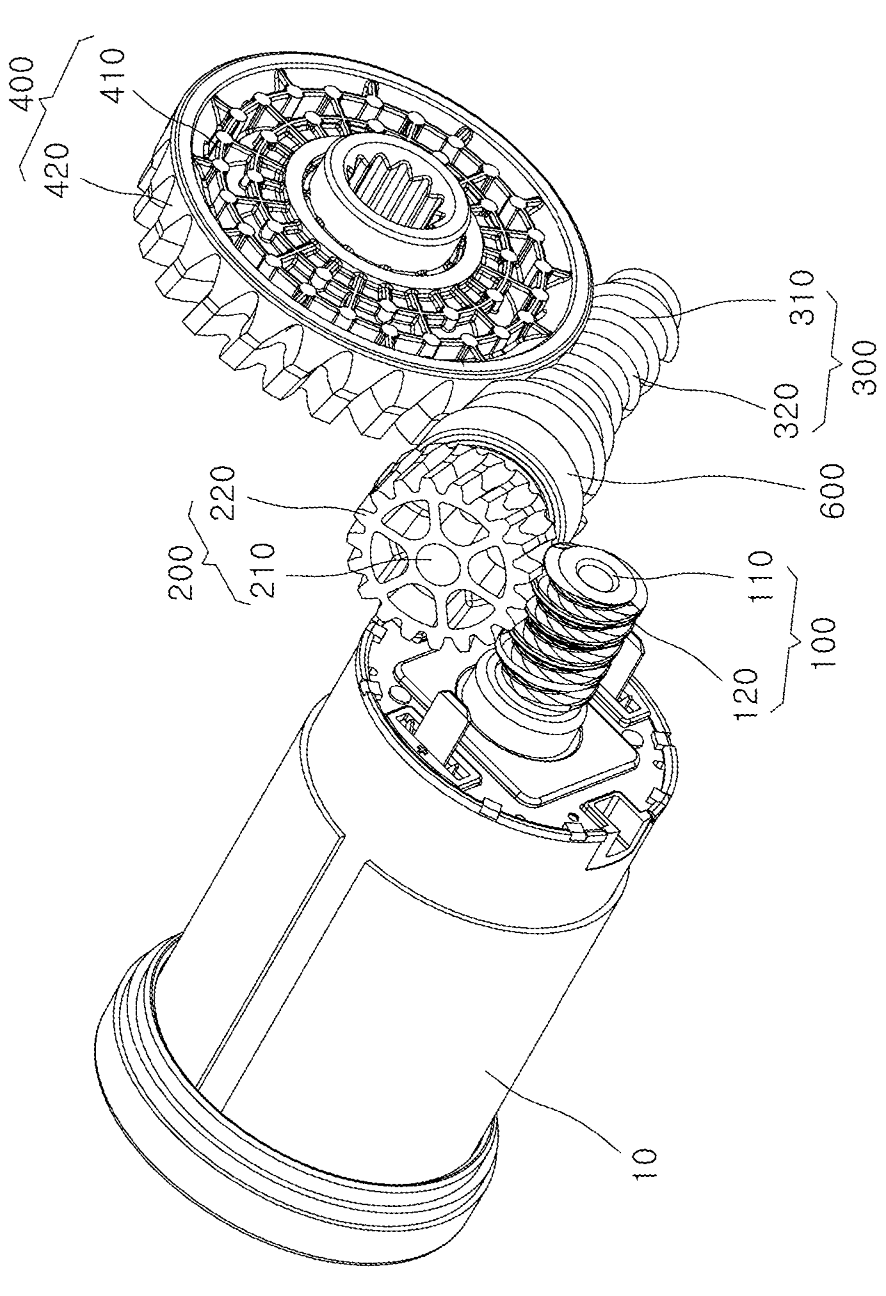
FIG. 8 is a diagram of FIG. 4, which is viewed in still another direction.
Figure 9:
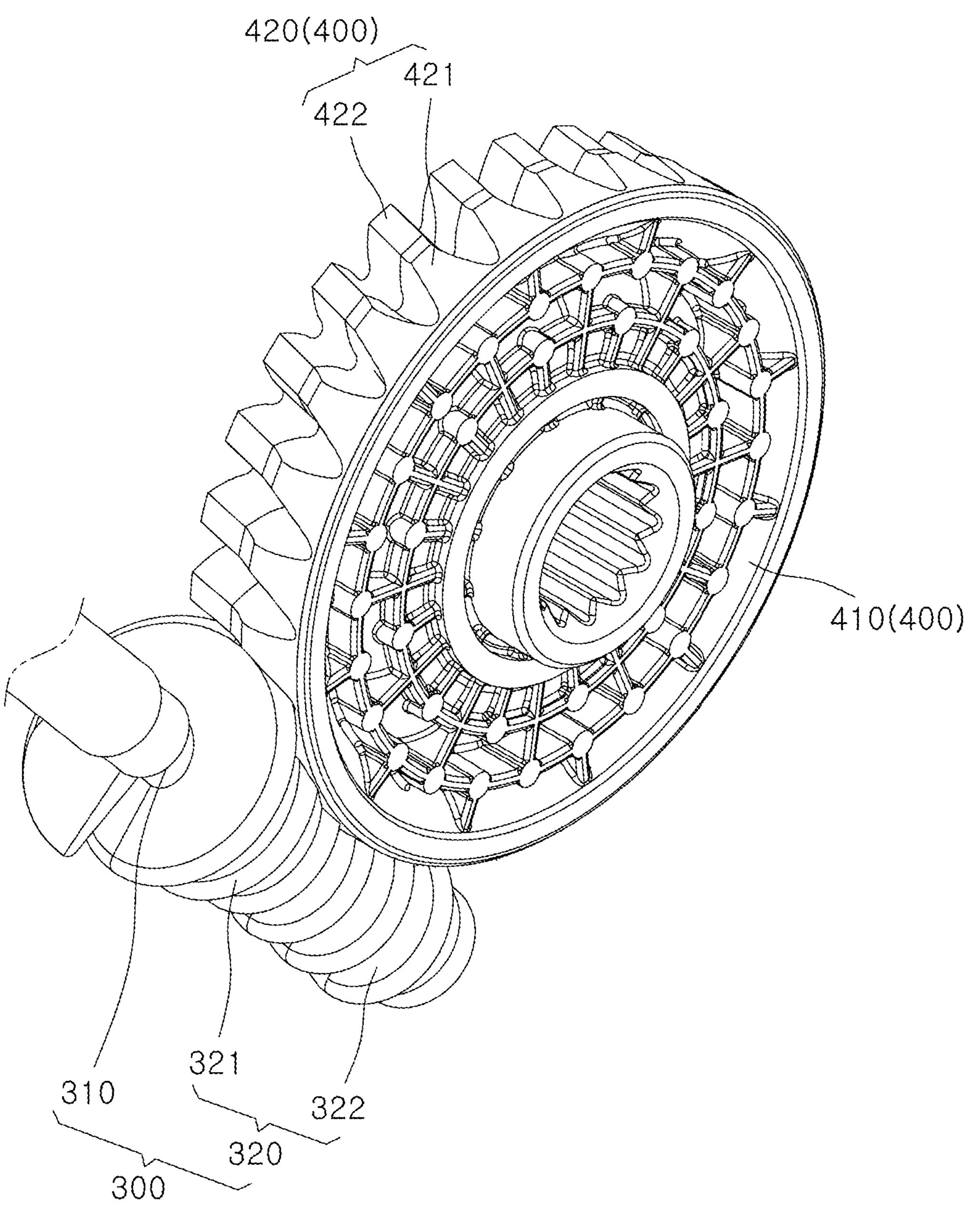
FIG. 9 is a perspective view illustrating a second worm shaft and a second worm wheel in FIG. 8.
Figure 10:
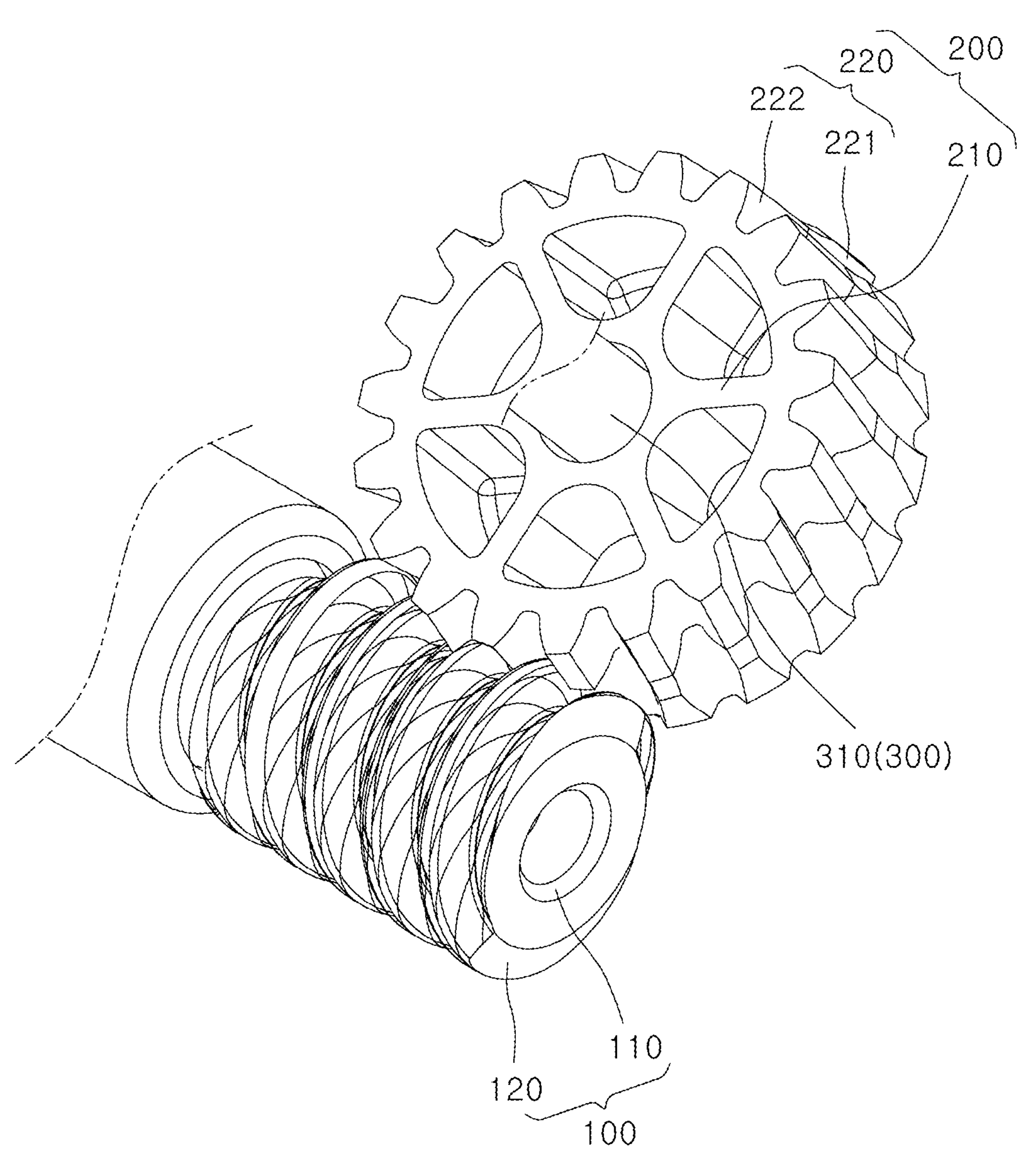
FIG. 10 is a perspective view illustrating a first worm shaft and a first worm wheel in FIG. 8.
Figure 11:
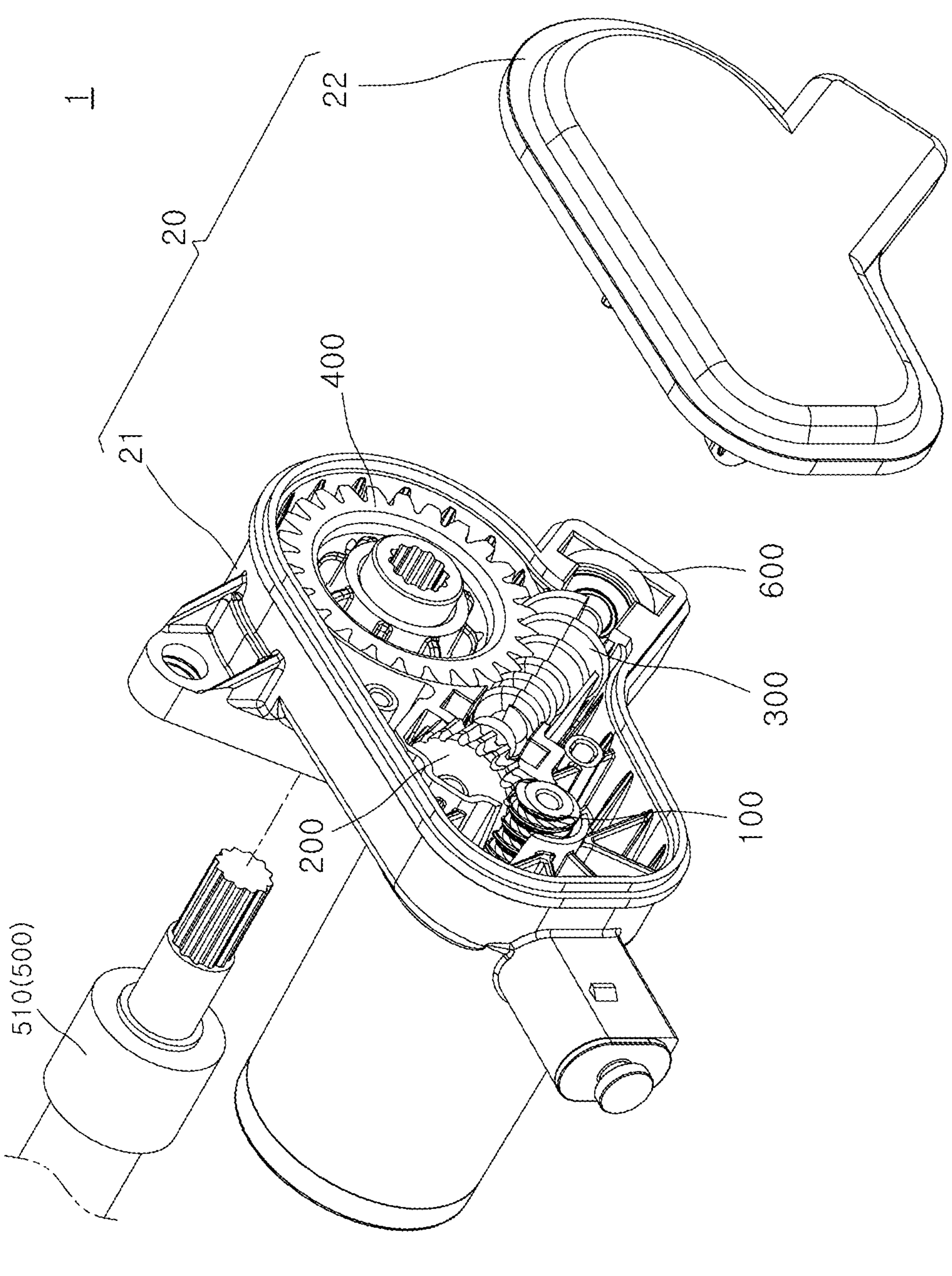
FIG. 11 is a diagram illustrating an actuator for a vehicle brake according to another embodiment of the present disclosure.
Figure 12:
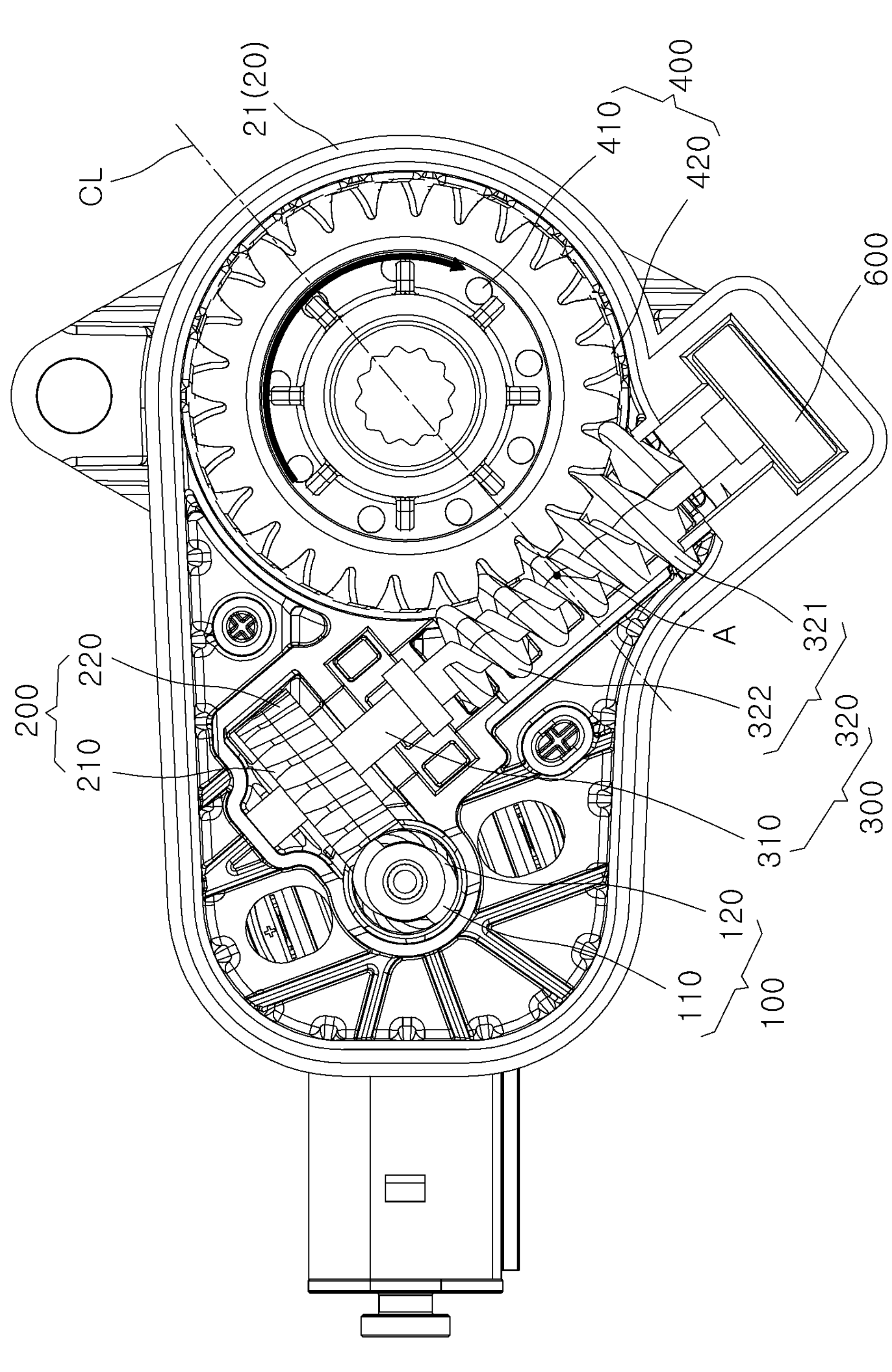
FIG. 12 is a front view of FIG. 11.
Figure 13:
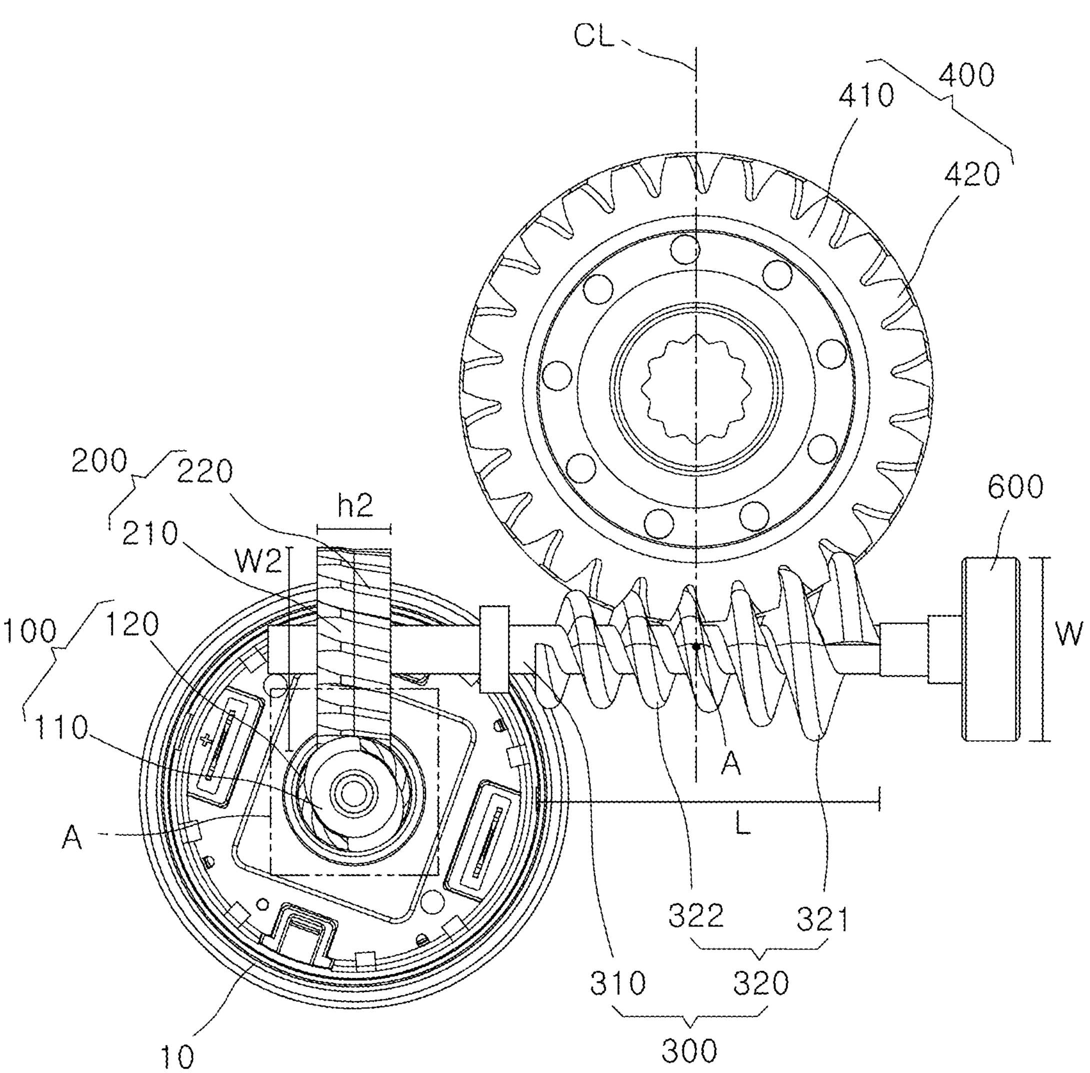
FIG. 13 is a front view illustrating that a part in FIG. 12 has been omitted.
Figure 14:
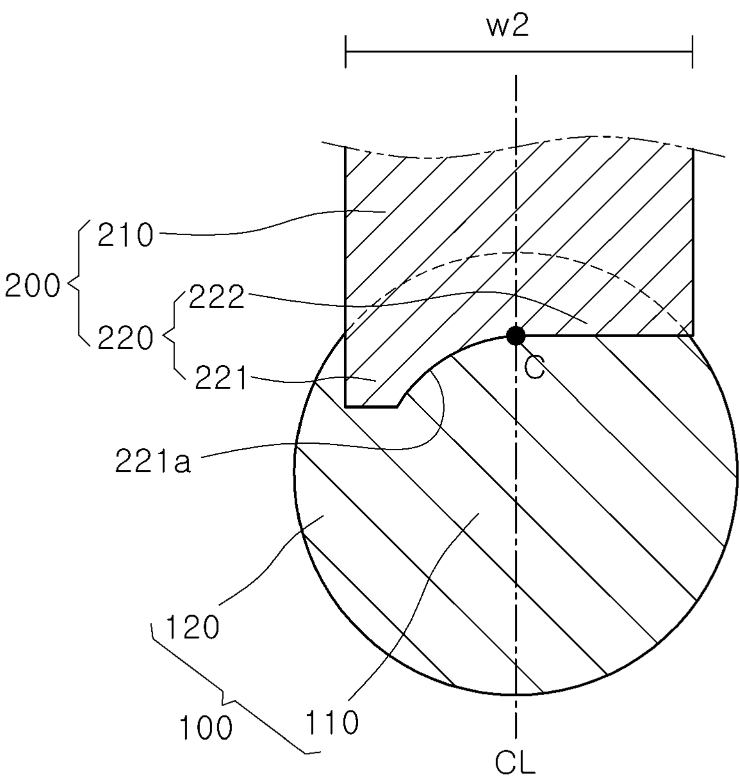
FIG. 14 is a cross-sectional view of a portion A in FIG. 13.
Figure 15:
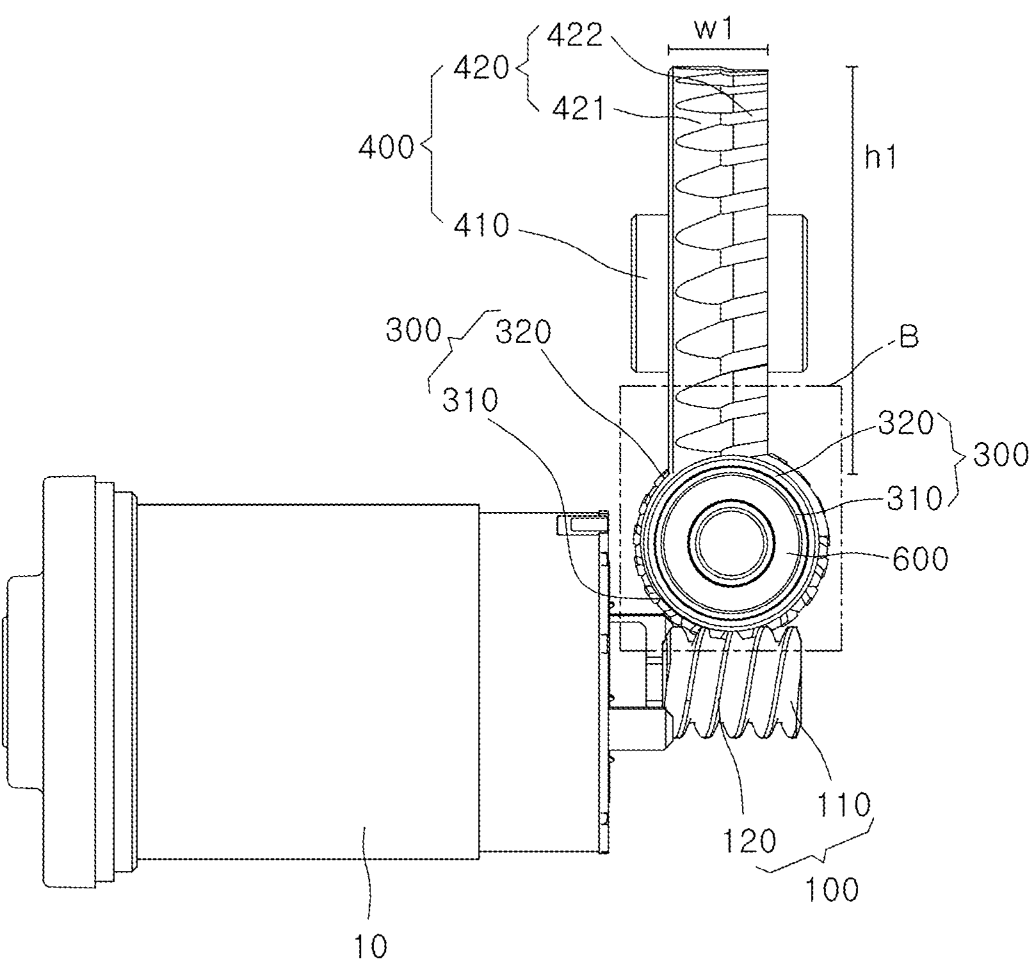
FIG. 15 is a diagram of FIG. 13, which is viewed in another direction.
Figure 16:
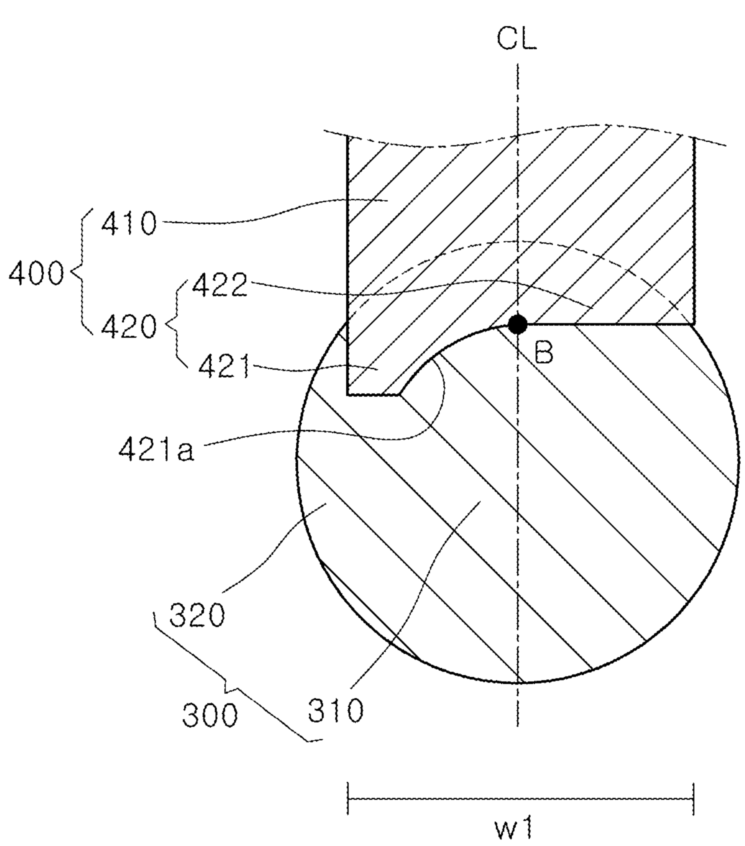
FIG. 16 is a cross-sectional view of a part B in FIG. 15.
Figure 17:
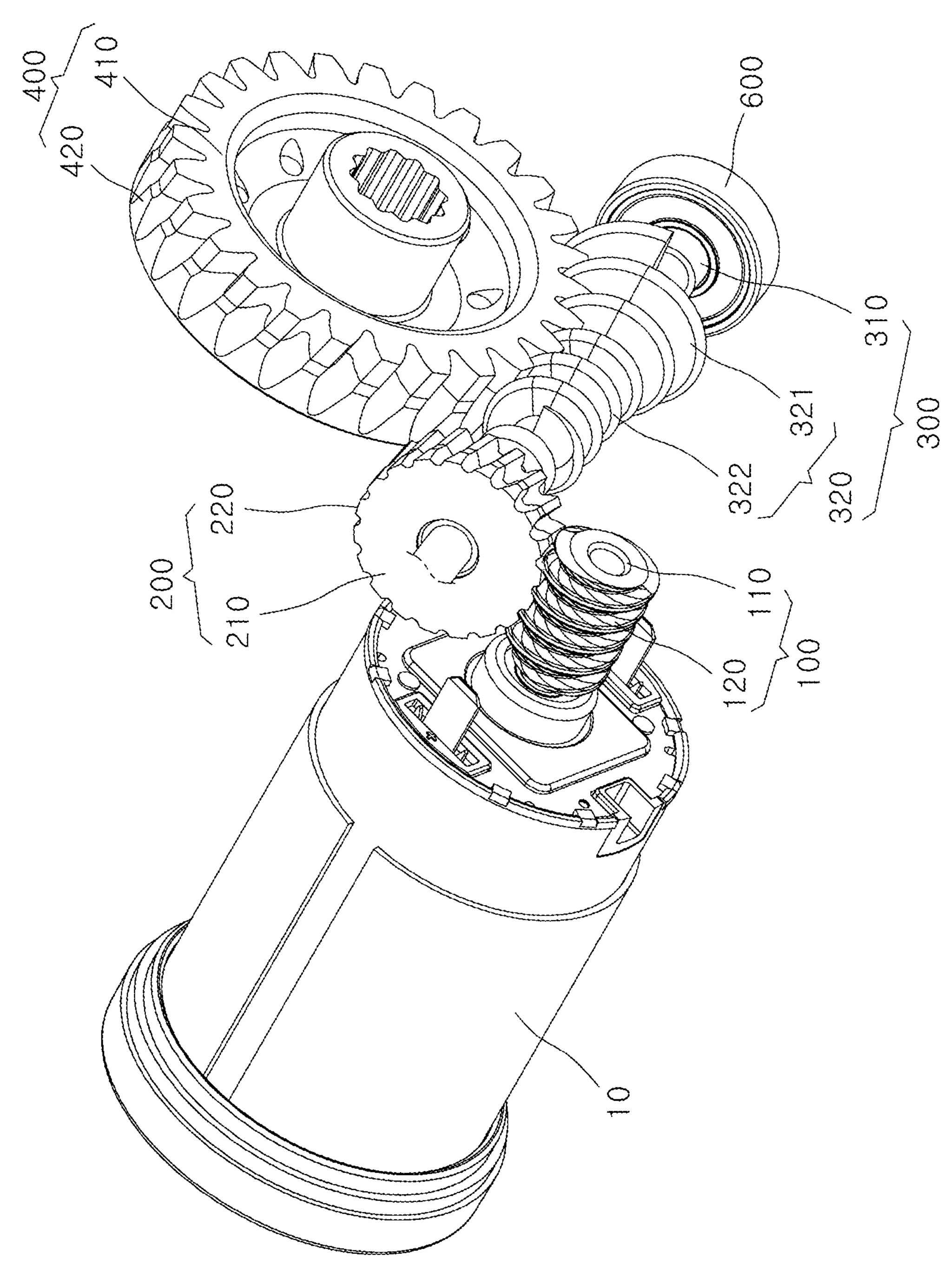
FIG. 17 is a diagram of FIG. 13, which is viewed in still another direction.
Figure 18:
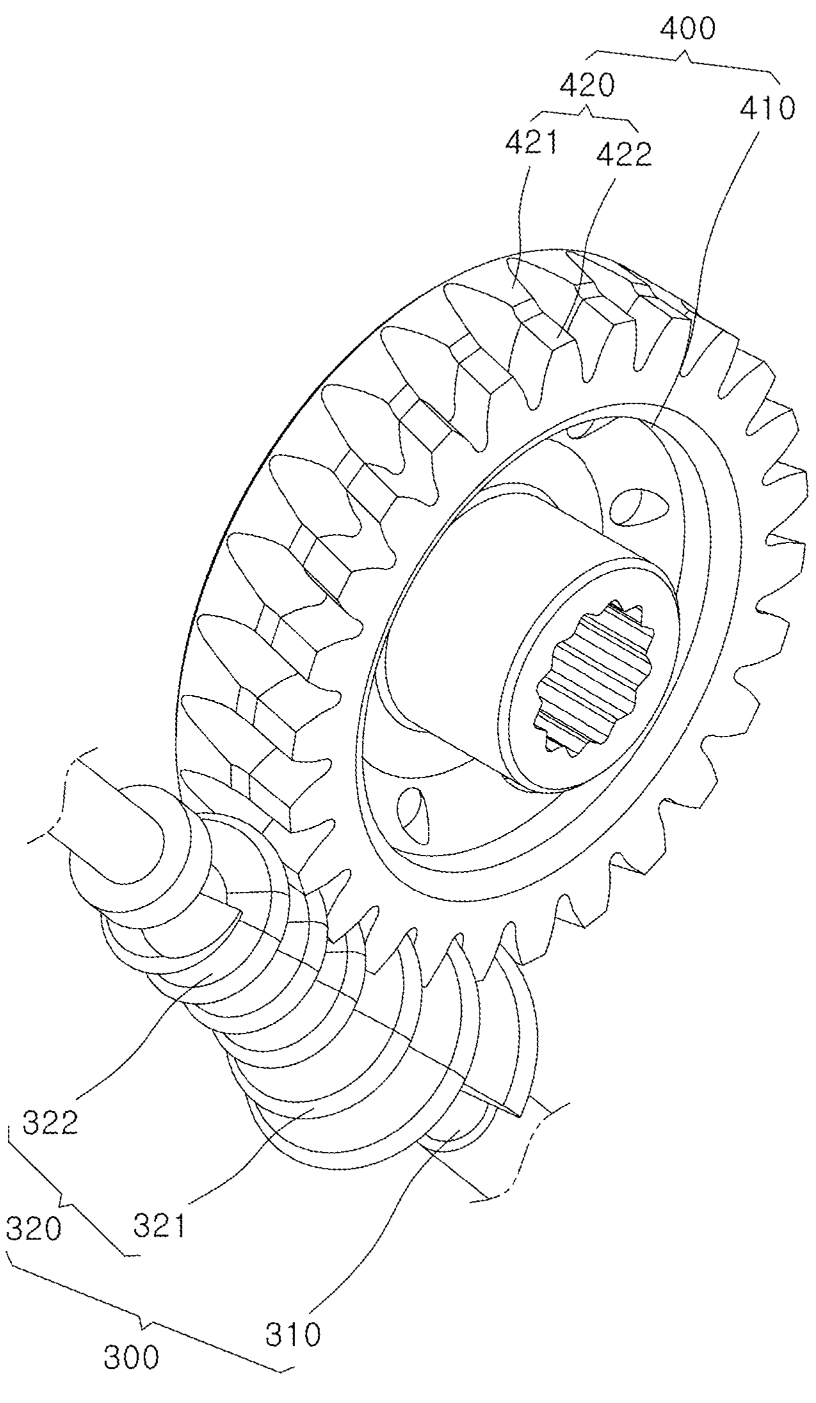
FIG. 18 is a perspective view illustrating a second worm shaft and a second worm wheel in FIG. 13.
Figure 19:
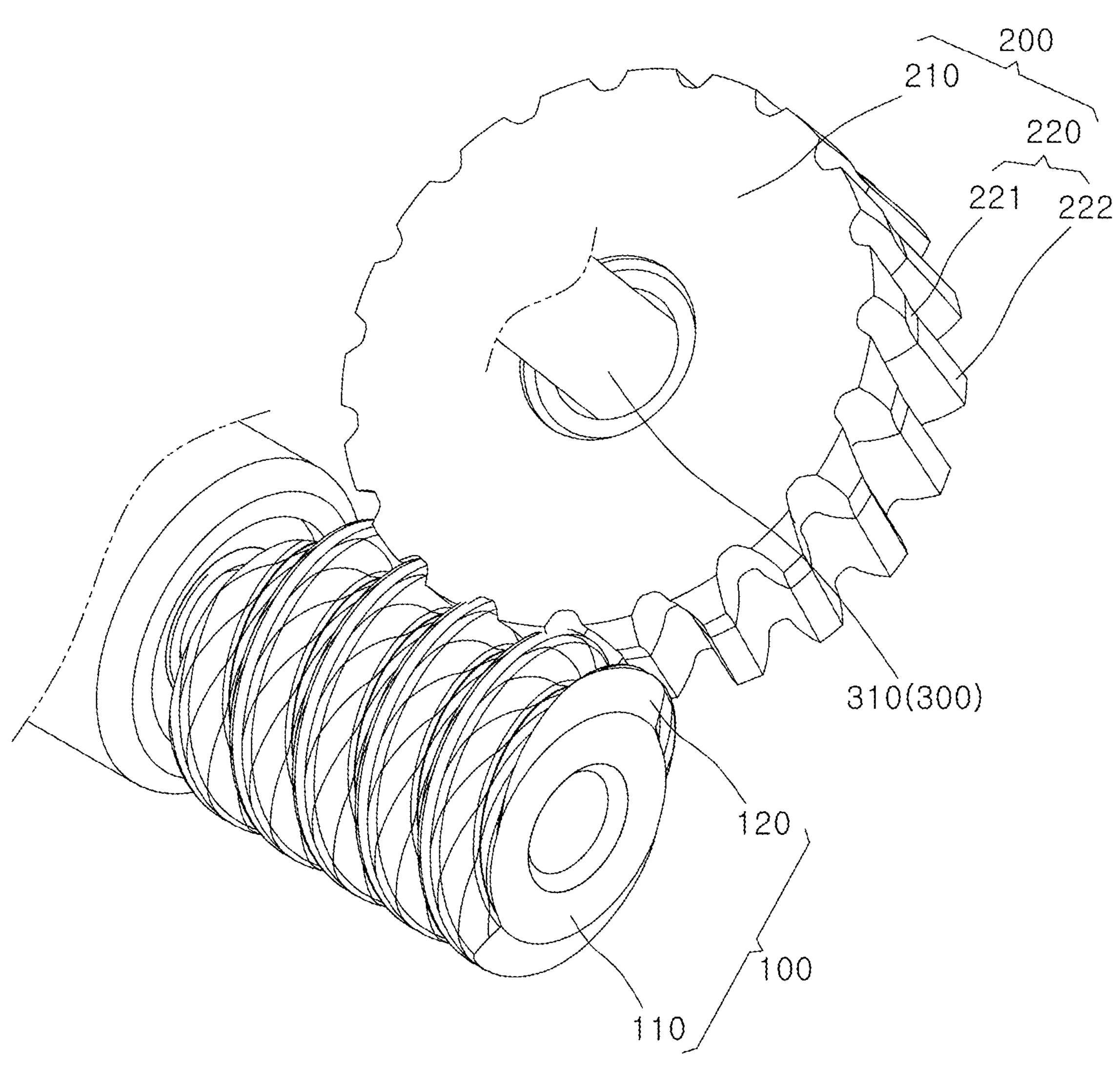
FIG. 19 is a perspective view illustrating a first worm shaft and a first worm wheel in FIG. 13.

FIG. 1 is a diagram schematically illustrating an actuator for a vehicle brake according to an embodiment of the present disclosure. FIG. 2 is an exploded perspective view of the actuator for a vehicle brake according to an embodiment of the present disclosure. FIG. 3 is a front view of the actuator for a vehicle brake according to an embodiment of the present disclosure. FIG. 4 is a front view illustrating that a part of the actuator for a vehicle brake according to an embodiment of the present disclosure has been omitted. FIG. 5 is a cross-sectional view of a portion A in FIG. 4. FIG. 6 is a diagram of FIG. 4, which is viewed in another direction. FIG. 7 is a cross-sectional view of a portion B in FIG. 6. FIG. 8 is a diagram of FIG. 4, which is viewed in still another direction. FIG. 9 is a perspective view illustrating a second worm shaft and a second worm wheel in FIG. 8. FIG. 10 is a perspective view illustrating a first worm shaft and a first worm wheel in FIG. 8. FIG. 11 is a diagram illustrating an actuator for a vehicle brake according to another embodiment of the present disclosure. FIG. 12 is a front view of FIG. 11. FIG. 13 is a front view illustrating that a part in FIG. 12 has been omitted. FIG. 14 is a cross-sectional view of a portion A in FIG. 13. FIG. 15 is a diagram of FIG. 13, which is viewed in another direction. FIG. 16 is a cross-sectional view of a part B in FIG. 15. FIG. 17 is a diagram of FIG. 13, which is viewed in still another direction. FIG. 18 is a perspective view illustrating a second worm shaft and a second worm wheel in FIG. 13. FIG. 19 is a perspective view illustrating a first worm shaft and a first worm wheel in FIG. 13.

Referring to FIGS. 1 to 10, an actuator 1 for a vehicle brake according to an embodiment of the present disclosure includes a motor 10, a housing 20, a first worm shaft 100, a first worm wheel 200, a second worm shaft 300, a second worm wheel 400, and a motion transformation unit 500.

Referring to FIGS. 11 to 19, an actuator 1 for a vehicle brake according to another embodiment of the present disclosure includes a motor 10, a housing 20, a first worm shaft 100, a first worm wheel 200, a second worm shaft 300, a second worm wheel 400, and a motion transformation unit 500.

The actuator 1 for a vehicle brake according to the another embodiment of the present disclosure is partially different from the actuator 1 according to the embodiment of the present disclosure in the structure, operation, etc. of the second worm shaft 300, and is basically the same as the actuator 1 according to the embodiment of the present disclosure in the remained elements. Accordingly, a description of the same structure and operation as those of the embodiment is omitted.

Referring to FIGS. 1, 2, and 11, the motor 10 provides rotatory power to the first worm shaft 100. The first worm shaft 100 is rotated by the operation of the motor 10. The rotatory power is delivered to the first worm wheel 200 engaged with the first worm shaft 100. The motor 10 is an element that provides the rotatory power to the first worm shaft 100. Various shapes or devices may be applied to the motor 10.

The first worm shaft 100 is connected to the motor 10 and is disposed within the housing 20. The housing 20 may include a housing body 21 and a housing cover 22.

The housing body 21 is formed in a shape having one side opened. The first worm shaft 100 is disposed within the housing body 21. The motor 10 may be disposed within the housing body 21, and may be disposed in a separate case outside the housing body 21.

The housing cover 22 is detachably coupled to the housing body 21, and covers the opened part of the housing body 21. The first worm shaft 100 is connected to a shaft (not illustrated) of the motor 10, and is rotated by electric power of the motor 10.

Referring to FIGS. 4 to 6 and 13 to 15, the first worm shaft 100 may include a first worm shaft body 110 and a first worm shaft gear tooth 120.

The first worm shaft body 110 is connected to the shaft of the motor 10.

The first worm shaft gear tooth 120 may be formed in a spiral shape on the outer circumference of the first worm shaft body 110. The first worm shaft gear tooth 120 may be provided in a plural number. The first worm shaft gear teeth 120 may be disposed on the outer circumference of the first worm shaft body 110 in a way to be spaced apart from each other. The first worm shaft gear teeth 120 are engaged with first worm wheel gear teeth 220 of the first worm wheel 200.

The first worm wheel 200 is disposed within the housing 20. The first worm wheel 200 is engaged with the first worm shaft 100, and is rotated in conjunction with the first worm shaft 100. The first worm wheel 200 is disposed within the housing body 21 and is rotated by the rotatory power of the first worm shaft 100, and rotates the second worm shaft 300.

The first worm wheel 200 is engaged with the first worm shaft 100, and includes the plurality of first worm wheel gear teeth 220. Each of the plurality of first worm wheel gear teeth 220 includes a first worm wheel enveloping gear tooth 221 and a first worm wheel cylindrical gear tooth 222.

Referring to FIG. 5, the first worm wheel enveloping gear tooth 221 according to an embodiment includes a first inclined part 221*a* having a protrusion height to the outside thereof increased from a central part C of the first worm wheel body 210 toward a first end (i.e., a right side on the basis of FIG. 5) on the basis of a virtual reference line CL that passes through the central part C.

A part of the first worm wheel 200 including the first worm wheel enveloping gear teeth 221 has a shape of a globoid worm wheel or a double enveloping worm wheel also called an enveloping worm wheel. In this case, the central part C is a middle part of a width W2 of the first worm wheel body 210 (refer to FIG. 5).

The first worm wheel cylindrical gear tooth 222 has a constant height from the central part C to a second end (i.e., a left end on the basis of FIG. 5), that is, a side opposite to the first end, on the basis of the virtual reference line CL. The gear tooth of the remaining part of the first worm wheel 200 including the first worm wheel cylindrical gear tooth 222 has a constant protrusion height as in a common cylindrical worm wheel.

The first worm wheel 200 includes the first worm wheel body 210 and the plurality of first worm wheel gear teeth 220. The second worm shaft 300 is connected to the central part of the first worm wheel body 210. A second worm shaft body 310 of the second worm shaft 300 may be coupled to the central part of the first worm wheel body 210.

The plurality of first worm wheel gear teeth 220 is disposed along the outer circumference of the first worm wheel body 210 in a way to be spaced apart from each other. The first worm wheel gear tooth 220 includes the first worm wheel enveloping gear tooth 221 and the first worm wheel cylindrical gear tooth 222.

The first worm wheel enveloping gear tooth 221 may be disposed at a reaction location of the first worm shaft 100 on the first worm wheel body 210. The reaction location of the first worm shaft 100 means a location at which the first worm wheel gear tooth 220 is subjected to a reaction from the first worm shaft gear tooth 120 when the first worm shaft gear tooth 120 of the first worm shaft 100 and the first worm wheel gear tooth 220 of the first worm wheel 200 are engaged with each other and rotated.

Referring to FIG. 14, the first worm wheel enveloping gear tooth 221 according to another embodiment of the present disclosure includes the first inclined part 221*a* having a protrusion height to the outside thereof increased from the central part C to a first end (i.e., a left side on the basis of FIG. 14) on the basis of the virtual reference line CL that passes through the central part C of the first worm wheel body 210.

A part of the first worm wheel 200 including the first worm wheel enveloping gear teeth 221 has a shape of a globoid worm wheel or a double enveloping worm wheel also called an enveloping worm wheel. In this case, the central part C is the middle part of the width W2 of the first worm wheel body 210 (refer to FIG. 14).

The first worm wheel cylindrical gear tooth 222 has a constant height from the central part C to a second end (i.e., a right end on the basis of FIG. 14) on the side opposite to the first end on the basis of the virtual reference line CL. The gear tooth of the remaining part of the first worm wheel 200 including the first worm wheel cylindrical gear tooth 222 has a constant protrusion height as in a common cylindrical worm wheel.

The first worm wheel 200 includes the first worm wheel body 210 and the plurality of first worm wheel gear teeth 220. The second worm shaft 300 is connected to the central part of the first worm wheel body 210. The second worm shaft body 310 of the second worm shaft 300 may be coupled to the central part of the first worm wheel body 210.

The plurality of first worm wheel gear teeth 220 is disposed along the outer circumference of the first worm wheel body 210 in a way to be spaced apart from each other. The first worm wheel gear tooth 220 includes the first worm wheel enveloping gear tooth 221 and the first worm wheel cylindrical gear tooth 222.

The first worm wheel gear tooth 220 of the first worm wheel 200 includes the first worm wheel enveloping gear tooth 221 and the first worm wheel cylindrical gear tooth 222. The first worm wheel enveloping gear tooth 221 may be disposed at a reaction location of the first worm shaft 100 on the first worm wheel body 210. Accordingly, the stiffness of the first worm wheel 200 can be increased because a surface contact area of the first worm wheel 200 with the first worm shaft 100 is increased, and thus damage to the first worm shaft 100 and the first worm wheel 200 can be prevented. Furthermore, mass production is possible because the first worm wheel 200 and the first worm shaft 100 can be manufactured as molds.

Referring to FIGS. 3, 4, 12, and 13, the second worm shaft 300 is disposed within the housing 20 and is connected to the first worm wheel 200. When the first worm wheel 200 is rotated, the second worm shaft 300 is rotated along with the first worm wheel 200. The second worm shaft 300 is coupled to the first worm wheel body 210 of the first worm wheel 200, and may be disposed in the housing body 21 of the housing 20.

The second worm shaft 300 includes a second worm shaft body 310 and a plurality of second worm shaft gear teeth 320. The plurality of second worm shaft gear teeth 320 may be consecutively formed in a spiral shape on the outer circumference of the second worm shaft body 310.

The second worm shaft body 310 is connected to the first worm wheel 200. The second worm shaft body 310 is coupled to the central part of the first worm wheel 200, and is disposed in the housing body 21 of the housing 20. The second worm shaft body 310 may be coupled to the central part of the first worm wheel body 210 of the first worm wheel 200.

The plurality of second worm shaft gear teeth 320 may include a plurality of second worm shaft enveloping gear teeth 321 and a plurality of second worm shaft cylindrical gear teeth 322, respectively.

The plurality of second worm shaft enveloping gear teeth 321 is disposed on the outer circumference of the second worm shaft body 310 in the length direction of the second worm shaft body 310 in a way to be spaced apart from each other, and is engaged with the second worm wheel gear tooth 420 of the second worm wheel 400.

Referring to FIG. 4, in the second worm shaft 300 according to an embodiment, the plurality of second worm shaft enveloping gear teeth 321 has widths, in other words, external diameters increased from the worm shaft central part A of the second worm shaft body 310 toward a first end (i.e., a left end on the basis of FIG. 4), on the basis of the virtual reference line CL that passes through a worm shaft central part A of the second worm shaft body 310, specifically, that passes through the center of the second worm wheel 400 and the worm shaft central part A.

That is, the second worm shaft enveloping gear teeth 321 have the external diameters gradually increased from the worm shaft central part A toward the first end. As seen from FIG. 4, an external diameter of the second worm shaft enveloping gear tooth 321 on a left end closest to the first worm wheel 200 is greater than an external diameter of the second worm shaft enveloping gear tooth 321 that is disposed in the worm shaft central part A.

The worm shaft central part A means a middle part of a length L of the second worm shaft body 310 (refer to FIG. 4). The external diameter of the second worm shaft enveloping gear tooth 321 is a distance from the center of the second worm shaft body 310 to the outermost side of the second worm shaft enveloping gear tooth 321.

A part (i.e., the left part on the basis of FIG. 4) of the second worm shaft 300 including the second worm shaft enveloping gear tooth 321 has a shape of a globoid worm shaft or a double enveloping worm shaft also called an enveloping worm shaft.

The external diameters of the plurality of second worm shaft cylindrical gear teeth 322 may be constant from the worm shaft central part A to a right end of the second worm shaft body 310 on the basis of the virtual reference line CL that passes through the center of the second worm wheel 400 and the worm shaft central part A.

The protrusion heights of the gear teeth, that is, the external diameters of the gear teeth of the remaining parts (i.e., a right part on the basis of FIG. 4) of the second worm shaft 300 including the second worm shaft cylindrical gear teeth 322 are constant as in a common cylindrical worm shaft.

The second worm wheel 400 may be rotated in a first direction so that braking power is generated for a brake for a vehicle. As in FIGS. 3 and 4, if the first direction in which the braking power is generated is a counterclockwise direction, the second worm wheel 400 generates the braking power while rotating in the counterclockwise direction. At this time, the second worm shaft 300 provides the rotatory power to the second worm wheel 400 so that the second worm wheel 400 is rotated in the counterclockwise direction.

The second worm shaft enveloping gear teeth 321 are disposed on the side in which the second worm shaft 300 approaches the second worm wheel 400 and the second worm shaft cylindrical gear teeth 322 are disposed on the side in which the second worm shaft 300 becomes distant from the second worm wheel 400, on the basis of the virtual reference line CL that passes through the worm shaft central part A and the center of the second worm wheel 400.

In order for the second worm wheel 400 to be rotated in the counterclockwise direction as in FIG. 3, electric power needs to be provided to the second worm wheel 400 on the left side of the virtual reference line CL, that is, the side in which the second worm shaft 300 approaches the second worm wheel 400. Accordingly, when the second worm wheel 400 is rotated in the counterclockwise direction, that is, the first direction, in order to generate the braking power, a greater load is applied to a part (i.e., the left part on the basis of FIG. 4) of the second worm shaft 300 that applies a force so that the second worm wheel 400 is rotated than to other parts (i.e., the right part on the basis of FIG. 4).

In the present embodiment, the second worm shaft enveloping gear tooth 321 is disposed at the part of the second worm shaft 300 that applies a force to a second worm wheel gear tooth 420 so that the second worm wheel 400 is rotated while approaching the second worm wheel gear tooth 420, and the second worm shaft cylindrical gear teeth 322 are disposed at the other parts. The second worm shaft enveloping gear tooth 321 is disposed at the part of the second worm shaft 300 that applies a force to the second worm wheel gear tooth 420 in order to increase load strength because a relatively greater load is applied to the part of the second worm shaft 300 than to the other parts.

In order to release the generated braking power, the second worm wheel 400 is rotated in a second direction, that is, a direction opposite to the first direction. At this time, the second worm shaft 300 provides rotatory power to the second worm wheel 400 so that the second worm wheel 400 is rotated in a clockwise direction, that is, a second direction in which the braking power is released. A force that is applied from the second worm shaft 300 to the second worm wheel 400 in order to release the braking power is smaller than a force when the braking power is generated.

In FIG. 4, in order for the second worm wheel 400 to be rotated in the clockwise direction in which the braking power is released, the second worm shaft 300 needs to provide electric power to the second worm wheel 400 on the right side of the virtual reference line CL, that is, the side in which the second worm shaft 300 approaches the second worm wheel 400. Accordingly, when the second worm wheel 400 is rotated in the clockwise direction, that is, the second direction, in order to release the braking power, the part of the second worm shaft 300 that applies the force to the second worm wheel gear tooth 420 becomes the second worm shaft cylindrical gear tooth 322 on the right side of the virtual reference line CL.

That is, when the braking power is generated, the second worm shaft 300 applies the rotatory power to the second worm wheel 400 through the second worm shaft enveloping gear tooth 321. When the braking power is released, however, the second worm shaft 300 applies the rotatory power to the second worm wheel 400 through the second worm shaft cylindrical gear tooth 322.

When the braking power is released, the force that is applied to the second worm wheel 400 is not relatively greater than that when the braking power is generated. Accordingly, although the second worm shaft cylindrical gear tooth 322 is disposed at a part engaged with the second worm wheel gear tooth 420, load stiffness of the second worm shaft 300 is stably secured.

As described above, in the present embodiment, the second worm shaft enveloping gear teeth 321 are disposed on one side of the worm shaft central part A of the second worm shaft 300, and the second worm shaft cylindrical gear teeth 322 are disposed on a side opposite to the one side.

When the second worm wheel 400 is rotated in the direction in which braking power is generated, the second worm shaft enveloping gear teeth 321 are disposed on the side in which a force is applied to the second worm wheel 400 on the second worm shaft body 310, in other words, the side in which the second worm shaft enveloping gear teeth 321 approach the second worm wheel 400, and the second worm shaft cylindrical gear teeth 322 are disposed in the remaining parts on the second worm shaft body 310.

Accordingly, although the second worm shaft 300 applies a great force to the second worm wheel 400 in order to generate the braking power, the second worm shaft 300 stably withstands a load by the second worm shaft enveloping gear tooth 321, so that load stiffness can be maximized.

Furthermore, noise upon braking can be further reduced because an engagement rate between the second worm shaft enveloping gear tooth 321 and the second worm wheel gear tooth 420 is increased when the braking power is generated. Furthermore, a manufacturing cost can be reduced because the second worm shaft enveloping gear tooth 321 is disposed only at a part of the second worm shaft 300, not the entire second worm shaft 300.

The second worm shaft enveloping gear tooth 321 may be disposed at a reaction location of the second worm wheel 400 on the second worm shaft body 310. In this case, the reaction location of the second worm wheel 400 means a location at which the second worm shaft gear tooth 320 is subjected to a reaction from the second worm wheel gear tooth 420 when the second worm wheel gear tooth 420 of the second worm wheel 400 and the second worm shaft gear tooth 320 of the second worm shaft 300 are engaged with each other and rotated.

Referring to FIG. 13, in the second worm shaft 300 according to another embodiment of the present disclosure, the plurality of second worm shaft enveloping gear teeth 321 have widths, in other words, external diameters increased from the worm shaft central part A of the second worm shaft body 310 toward the first end (i.e., a right end on the basis of FIG. 13) on the basis of the virtual reference line CL that passes through the worm shaft central part A of the second worm shaft body 310, specifically, that passes through the center of the second worm wheel 400 and the worm shaft central part A.

That is, the external diameters of the second worm shaft enveloping gear teeth 321 are gradually increased from the worm shaft central part A toward the first end. As seen from FIG. 13, the external diameter of the second worm shaft enveloping gear tooth 321 at a right end closest to the side of a bearing 600 is greater than the external diameter of the second worm shaft enveloping gear tooth 321 that is disposed in the worm shaft central part A.

The worm shaft central part A means the middle part of the length L of the second worm shaft body 310 (refer to FIG. 13). The external diameter of the second worm shaft enveloping gear tooth 321 is the distance from the center of the second worm shaft body 310 to the outermost side of the second worm shaft enveloping gear tooth 321.

A part (i.e., a right part on the basis of FIG. 3) of the second worm shaft 300 including the second worm shaft enveloping gear tooth 321 has a shape of a globoid worm shaft or a double enveloping worm shaft also called an enveloping worm shaft.

The external diameters of the plurality of second worm shaft cylindrical gear teeth 322 may be constant from the worm shaft central part A to the left end of the second worm shaft body 310 on the basis of the virtual reference line CL that passes through the worm shaft central part A of the second worm shaft body 310.

The protrusion heights of the gear teeth, that is, the external diameters of the gear teeth, of the remaining parts (i.e., a right part on the basis of FIG. 13) of the second worm shaft 300 including the second worm shaft cylindrical gear teeth 322 are constant as in a common cylindrical worm shaft.

The second worm wheel 400 may be rotated in a first direction so that braking power is generated for a brake for a vehicle. If the first direction in which the braking power is generated is a clockwise direction as in FIGS. 12 and 13, the second worm wheel 400 generates the braking power while rotating in the clockwise direction. In this case, the second worm shaft 300 provides rotatory power to the second worm wheel 400 so that the second worm wheel 400 is rotated in the clockwise direction.

The second worm shaft enveloping gear tooth 321 is disposed on the side in which the second worm shaft 300 approaches the second worm wheel 400 and the second worm shaft cylindrical gear tooth 322 is disposed on the side in which the second worm shaft 300 becomes distant from the second worm wheel 400, on the basis of the virtual reference line CL that passes through the worm shaft central part A and the center of the second worm wheel 400.

In order for the second worm wheel 400 to be rotated in the clockwise direction as in FIG. 12, the second worm shaft 300 needs to provide electric power to the second worm wheel 400 on the right side of the virtual reference line CL, that is, the side in which the second worm shaft 300 approaches the second worm wheel 400. Accordingly, when the second worm wheel 400 is rotated in the clockwise direction, that is, the first direction, in order to generate the braking power, a greater load is applied to the part (i.e., the right part on the basis of FIG. 13) of the second worm shaft 300 that applies a force so that the second worm wheel 400 is rotated than to other parts thereof (i.e., a left part on the basis of FIG. 13).

In the present embodiment, the second worm shaft enveloping gear tooth 321 is disposed at the part of the second worm shaft 300 that applies a force to the second worm wheel gear tooth 420 while approaching the second worm wheel gear tooth 420 so that the second worm wheel 400 is rotated, and the second worm shaft cylindrical gear teeth 322 are disposed in the other parts. The second worm shaft enveloping gear tooth 321 is disposed at the part of the second worm shaft 300 that applies a force to the second worm wheel gear tooth 420 in order to increase load strength because a relatively greater load is applied to the part of the second worm shaft 300 than to the other parts.

If the second worm shaft enveloping gear tooth 321 is disposed closer to the first worm wheel 200 than the second worm shaft cylindrical gear tooth 322, the bearing 600 is disposed between the first worm wheel 200 and the second worm shaft enveloping gear tooth 321 and supports the rotation of the second worm shaft 300. The bearing 600 may be disposed in parallel to the first worm wheel 200.

In order to release the generated braking power, the second worm wheel 400 is rotated in a second direction, that is, a direction opposite to the first direction. At this time, the second worm shaft 300 provides rotatory power to the second worm wheel 400 so that the second worm wheel 400 is rotated in a counterclockwise direction, that is, the second direction in which the braking power is released. A force that is applied from the second worm shaft 300 to the second worm wheel 400 in order to release the braking power is smaller than a force when the braking power is generated.

In FIG. 13, in order for the second worm wheel 400 to be rotated in the counterclockwise direction in which the braking power is released, the second worm shaft 300 needs to provide electric power to the second worm wheel 400 on the left side of the virtual reference line CL, that is, the side in which the second worm shaft 300 approaches the second worm wheel 400. Accordingly, if the second worm wheel 400 is rotated in the counterclockwise direction, that is, the second direction, in order to release the braking power, the part of the second worm shaft 300 that applies a force to the second worm wheel gear tooth 420 becomes the second worm shaft cylindrical gear tooth 322 on the left side of the virtual reference line CL.

That is, if the braking power is generated, the second worm shaft 300 applies the rotatory power to the second worm wheel 400 through the second worm shaft enveloping gear tooth 321. If the braking power is released, however, the second worm shaft 300 applies the rotatory power to the second worm wheel 400 through the second worm shaft cylindrical gear tooth 322.

If the second worm shaft enveloping gear tooth 321 is disposed further from the first worm wheel 200 than the second worm shaft cylindrical gear tooth 322, the bearing 600 is disposed on a side opposite to the side of the first worm wheel 200. That is, the bearing 600 is disposed further from the first worm wheel 200 than the second worm shaft enveloping gear tooth 321, and supports the rotation of the second worm shaft 300. In the present embodiment, the second worm shaft 300 has one end rotatably supported by the first worm wheel 200, and has the other end rotatably supported by the bearing 600.

A force that applied to the second worm wheel 400 when braking power is released is not relatively greater than a force when the braking power is generated. Accordingly, although the second worm shaft cylindrical gear tooth 322 is disposed at a part geared with the second worm wheel gear tooth 420, load stiffness of the second worm shaft 300 is stably secured.

As described above, in the present embodiment, the second worm shaft enveloping gear tooth 321 is disposed on one side of the worm shaft central part A of the second worm shaft 300, and the second worm shaft cylindrical gear tooth 322 is disposed on the other side of the worm shaft central part A of the second worm shaft 300.

When the second worm wheel 400 is rotated in the direction in which the braking power is generated, the second worm shaft enveloping gear tooth 321 is disposed on the side in which the second worm shaft enveloping gear tooth 321 applies a force to the second worm wheel 400, in other words, on the side in which the second worm shaft enveloping gear tooth 321 approaches the second worm wheel 400 on the second worm shaft body 310. The second worm shaft cylindrical gear teeth 322 are disposed in the remaining parts on the second worm shaft body 310.

Accordingly, although the second worm shaft 300 applies a greater force to the second worm wheel 400 in order to generate braking power, load stiffness of the second worm shaft 300 can be maximized because the second worm shaft 300 stably withstands a load by the second worm shaft enveloping gear tooth 321.

Furthermore, noise upon braking can be reduced because an engagement rate between the second worm shaft enveloping gear tooth 321 and the second worm wheel gear tooth 420 is increased when the braking power is generated. Furthermore, a manufacturing cost can be reduced because the second worm shaft enveloping gear tooth 321 is disposed only at a part of the second worm shaft 300, not the entire second worm shaft 300.

The second worm shaft gear teeth 320 includes the second worm shaft enveloping gear teeth 321 and the second worm shaft cylindrical gear teeth 322, respectively. The plurality of second worm shaft enveloping gear teeth 321 have external diameters increased from the worm shaft central part A of the second worm shaft body 310 toward the first end, but may be disposed in reaction locations of the second worm wheel 400 on the second worm shaft body 310.

Referring to FIGS. 4 and 13, when cross sections of the plurality of second worm shaft gear teeth 320, which are cut in the length direction of the second worm shaft 300, are viewed, the external diameters of the plurality of second worm shaft enveloping gear teeth 321 are gradually reduced from the end on one side of the second worm shaft body 310 toward the worm shaft central part A. The external diameters of the plurality of second worm shaft cylindrical gear teeth 322 are constantly maintained from the worm shaft central part A to the other side of the second worm shaft body 310. As described above, the entire cross-sectional shape of the plurality of second worm shaft gear teeth 320 may form a half double-headed drum shape.

Accordingly, as a surface contact area of the second worm shaft gear tooth 320 with the second worm wheel 400 is increased, the occurrence of noise can be reduced because an engagement rate between the second worm shaft gear tooth 320 and the second worm wheel 400 is increased. Furthermore, emotional quality can also be improved because the number of vibrations can also be reduced upon engagement operation between the second worm shaft 300 and the second worm wheel 400.

Furthermore, the second worm shaft 300 can withstand a greater load because a surface contact area of the second worm shaft 300 with the second worm wheel 400 in a part at which the second worm shaft enveloping gear teeth 321 are formed is increased compared to the existing cylindrical worm gear type worm shaft. Furthermore, since the second worm shaft cylindrical gear teeth 322 are partially provided in the second worm shaft 300, a manufacturing process can be simplified, efficiency of a work is high, and a cost can be reduced.

A case in which a rotation direction in which the second worm wheel 400 generates the braking power is the counterclockwise direction as illustrated in FIGS. 3 and 4 is described below. A location of a reaction of the second worm shaft gear tooth 320 of the second worm shaft 300, which is subjected to the second worm wheel gear tooth 420 of the second worm wheel 400, may be the left side of the drawing on the basis of the virtual reference line CL that perpendicularly passes through the worm shaft central part A of the second worm shaft body 310.

Accordingly, the second worm shaft enveloping gear tooth 321 of the second worm shaft gear tooth 320 may be disposed on the left side of the drawing on the basis of the virtual reference line CL that passes through the worm shaft central part A of the second worm shaft body 310. At this time, the bearing 600 is disposed between the first worm wheel 200 and the second worm shaft enveloping gear tooth 321, and supports the rotation of the second worm shaft 300.

A case in which the rotation direction in which the second worm wheel 400 generates the braking power is the clockwise direction as illustrated in FIGS. 12 and 13 is described below. A location of a reaction of the second worm shaft gear tooth 320 of the second worm shaft 300, which is subjected to the second worm wheel gear tooth 420 of the second worm wheel 400, may be the right side of the drawing on the basis of the virtual reference line CL that passes through the worm shaft central part A of the second worm shaft body 310.

Accordingly, the second worm shaft enveloping gear tooth 321 of the second worm shaft gear tooth 320 may be disposed on the right side of the drawing on the basis of the virtual reference line CL that passes through the worm shaft central part A of the second worm shaft body 310. At this time, the bearing 600 is disposed closer to the second worm shaft enveloping gear tooth 321 than to the second worm shaft cylindrical gear tooth 322, and supports the rotation of the second worm shaft 300.

Referring to FIGS. 3, 4, 12, and 13, the second worm wheel 400 is engaged with the second worm shaft 300, and includes the second worm wheel body 410 and the plurality of second worm wheel gear teeth 420. The second worm wheel body 410 is rotatably coupled to the housing 20. The second worm wheel body 410 is rotatably coupled to the housing body 21 of the housing 20.

Braking power of a brake for a vehicle is generated or released depending on the rotation direction of the second worm wheel 400. FIGS. 3 and 4 illustrate examples in which the rotation direction in which the second worm wheel 400 generates braking power is a counterclockwise direction. FIGS. 12 and 13 illustrate examples in which the rotation direction in which the second worm wheel 400 generates braking power is a clockwise direction. Accordingly, in FIGS. 3 and 4, the rotation direction in which the second worm wheel 400 releases braking power is the clockwise direction. In FIGS. 12 and 13, the rotation direction in which the second worm wheel 400 releases braking power is the counterclockwise direction.

The plurality of second worm wheel gear teeth 420 is disposed along the outer circumference of the second worm wheel body 410 in a way to be spaced apart from each other. The second worm wheel gear teeth 420 include second worm wheel enveloping gear teeth 421 and second worm wheel cylindrical gear teeth 422, respectively.

Referring to FIGS. 6 to 9 and 15 to 18, each of the second worm wheel enveloping gear teeth 421 includes a second worm wheel inclined part 421*a* having a protrusion height to the outside thereof increased from a central part B of the second worm wheel body 410 toward a first end (i.e., a right side on the basis of FIG. 7 and a left side on the basis of FIG. 16).

A part of the second worm wheel 400 including the second worm wheel enveloping gear teeth 421 has a shape of a globoid worm wheel or a double enveloping worm wheel also called an enveloping worm wheel. In this case, the central part B means a middle part of a width W1 of the second worm wheel body 410 (refer to FIGS. 7 and 16).

The second worm wheel cylindrical gear teeth 422 have a constant height from the central part B to a second end, that is, a side opposite to the first end (i.e., a left end on the basis of FIG. 7 and a right end on the basis of FIG. 16). The gear teeth of the remaining parts of the second worm wheel 400 including the second worm wheel cylindrical gear teeth 422 have a constant protrusion height as in a common cylindrical worm wheel.

The second worm wheel enveloping gear tooth 421 may be disposed at a reaction location of the second worm shaft 300 on the second worm wheel body 410. The reaction location of the second worm shaft 300 means a location at which the second worm wheel enveloping gear tooth 421 is subjected to a reaction from the second worm shaft gear tooth 320 when the second worm wheel gear tooth 420 of the second worm wheel 400 and the second worm shaft gear tooth 320 of the second worm shaft 300 are engaged with each other and rotated.

The second worm wheel gear tooth 420 of the second worm wheel 400 includes the second worm wheel enveloping gear tooth 421 and the second worm wheel cylindrical gear tooth 422. The second worm wheel enveloping gear tooth 421 may be disposed at the reaction location of the second worm shaft 300.

The second worm wheel enveloping gear tooth 421 is disposed on one side of the second worm wheel 400, but the second worm wheel cylindrical gear tooth 422 is disposed on the other side of the second worm wheel 400. Accordingly, the second worm wheel 400 can be manufactured as a mold and mass produced because the mold of the second worm wheel 400 can be extracted toward the second worm wheel cylindrical gear tooth 422. Furthermore, the stiffness of the second worm wheel 400 can be increased because a surface contact area of the second worm wheel 400 with the second worm shaft 300 is increased, and thus damage to the second worm shaft 300 and the second worm wheel 400 can be prevented.

Referring to FIGS. 2 and 11, the motion transformation unit 500 is coupled to the second worm wheel 400, and it transforms a rotatory motion of the second worm wheel 400 into a rectilinear motion and may pressurize at least any one of a pair of brake pads (not illustrated).

The motion transformation unit 500 is a device that transforms the rotation of the second worm wheel 400 into a rectilinear motion. The motion transformation unit 500 moves toward the brake pad and generates braking power for a brake for a vehicle by pressurizing the brake pad, or moves to a side opposite to the brake pad and releases the generated braking power by releasing the pressurization applied to the brake pad, depending on a rotation direction of the second worm wheel 400.

The motion transformation unit 500 includes a screw bar 510, a spindle part (not illustrated), and a piston part (not illustrated). The screw bar 510 is disposed within a caliper body part (not illustrated), and is rotated by rotatory power of the second worm wheel 400.

The spindle part moves in a straight line in response to the rotation of the screw bar 510. The spindle part is geared with the outside of the screw bar 510, and moves in a straight line in response to the rotation of the screw bar 510. For example, the screw bar 510 has a rod shape, and it is inserted into the spindle part 520 and has a male screw thread (not illustrated) provided on the outside thereof. The spindle part includes a female screw thread (not illustrated) engaged with the male screw thread on the inside thereof. The rotation of the spindle part is restricted by the screw bar 510. That is, the spindle part 520 may move in response to the rotation of the screw bar 510.

The piston part is installed in a shape that surrounds the outside of the spindle part, and it moves along with the spindle part and pressurizes the brake pad (not illustrated). When the spindle part pressurizes the piston part, the piston part pressurizes the brake pad. The brake pad generates braking power by being compressed against a wheel disk (not illustrated). The piston part according to an embodiment is formed in a cylindrical shape, and has a shape in which a direction into which the spindle part is inserted has been opened and a part that faces the brake pad has been closed.

Referring to FIGS. 3 and 12, the bearing 600 is disposed within the housing 20, and it surrounds the second worm shaft 300 and supports the rotation of the second worm shaft 300.

The bearing 600 may be disposed between the first worm wheel 200 and the second worm shaft enveloping gear tooth 321 of the second worm shaft gear tooth 320 as in FIG. 4 or may be disposed closer to the second worm shaft enveloping gear tooth 321 than to the second worm shaft cylindrical gear tooth 322 as in FIG. 13, and may support the rotation of the second worm shaft 300. In this case, the location of the bearing 600 may be changed depending on a rotation direction of the second worm wheel 400 that is rotated by rotatory power of the motor 10.

The actuator for a vehicle brake according to the present invention can be applied not only to a vehicle brake, but also to an electronic parking brake. Although exemplary embodiments of the disclosure have been disclosed for illustrative purposes, those skilled in the art will appreciate that various modifications, additions and substitutions are possible, without departing from the scope and spirit of the disclosure as defined in the accompanying claims.

Thus, the true technical scope of the disclosure should be defined by the following claims.

What is claimed is:

1. An actuator for a vehicle brake, comprising:
- a housing;
- a first worm shaft connected to a motor and disposed within the housing;
- a first worm wheel disposed within the housing, engaged with the first worm shaft, and rotated in conjunction with a rotation of the first worm shaft;
- a second worm shaft comprising:
  - a second worm shaft body disposed within the housing and connected to the first worm wheel, and
  - a plurality of second worm shaft gear teeth disposed on an outer circumference of the second worm shaft body in a way to be spaced apart from each other, the plurality of second worm shaft gear teeth comprising:
    - second worm shaft enveloping gear teeth, each having an external diameter that is increased from a worm shaft central part of the second worm shaft body toward a first end of the second worm shaft body, and
    - second worm shaft cylindrical gear teeth, each having a constant external diameter from the worm shaft central part to a second end of the second worm shaft body,
  - wherein the first end of the second worm shaft body and the second end of the second worm shaft body oppose each other in a longitudinal axis of the second worm shaft body, and wherein a portion of the second worm shaft including the second worm shaft enveloping gear teeth has a shape of a globoid worm shaft; and a single second worm wheel, wherein the second worm wheel is engaged with the second worm shaft and configured to deliver electric power to a piston part that pressurizes or releases a brake, wherein the second worm wheel comprises:

a second worm wheel body rotatably installed in the housing; and a plurality of second worm wheel gear teeth disposed along an outer circumference of the second worm wheel body in a way to be spaced apart from each other, the plurality of second worm wheel gear teeth comprising:

a second worm wheel enveloping gear tooth comprising a second worm wheel inclined part having a protrusion height increased from a central part of a second worm wheel gear tooth among the plurality of second worm wheel gear teeth toward a first end of the second worm wheel gear tooth, and a second worm wheel cylindrical gear tooth having a constant protrusion height from the central part to a second end of the second worm wheel gear tooth, wherein, when the second worm wheel rotates in a direction in which braking power is generated, the second worm shaft enveloping gear teeth are disposed on the second worm shaft body on a side in which a force is applied to the second worm wheel and closer to the second worm wheel, and the second worm shaft cylindrical gear teeth are disposed on an opposite side of the second worm shaft body.

2. The actuator of claim 1, wherein at least one of the second worm shaft enveloping gear teeth is disposed on a first side on the second worm shaft body, the first side approaches the second worm wheel in response to the second worm shaft being rotated in a direction in which the second worm shaft generates braking power.

3. The actuator of claim 2, wherein:

at least one of the second worm shaft cylindrical gear teeth is disposed on a second side on the second worm shaft body, the second side becomes distant from the second worm wheel in response to the second worm shaft being rotated in the direction in which the second worm shaft generates the braking power, and the first and second sides oppose each other on a basis of the worm shaft central part.

4. The actuator of claim 3, further comprising a bearing disposed within the housing and configured to support a rotation of the second worm shaft.

5. The actuator of claim 4, wherein:

the at least one of the second worm shaft enveloping gear teeth is disposed closer to the first worm wheel than the at least one of the second worm shaft cylindrical gear teeth, and the bearing is disposed between the first worm wheel and the at least one of the second worm shaft enveloping gear teeth.

6. The actuator of claim 4, wherein:

the at least one of the second worm shaft enveloping gear teeth is disposed further from the first worm wheel than the at least one of the second worm shaft cylindrical gear teeth, and the bearing is disposed further from the first worm wheel than from the at least one of the second worm shaft enveloping gear teeth.

7. The actuator of claim 1, wherein in response to the second worm shaft being rotated in a direction in which the second worm shaft generates braking power, at least one of the second worm shaft enveloping gear teeth is disposed on a third side on the second worm shaft body, the third side is one in which the second worm shaft applies a force greater than a force applied to at least one of the second worm shaft cylindrical gear teeth.

8. The actuator of claim 7, wherein:

in response to the second worm shaft being rotated in a direction in which the second worm shaft releases the braking power, the at least one of the second worm shaft cylindrical gear teeth is disposed on a fourth side on the second worm shaft body, the fourth side is one in which the second worm shaft applies a force greater than a force applied to the at least one of the second worm shaft enveloping gear teeth, and the third and fourth sides oppose each other on a basis of the worm shaft central part.

9. The actuator of claim 1, wherein the second end of the second worm wheel gear tooth is an end opposite the first end of the second worm wheel gear tooth.

10. The actuator of claim 1, wherein an external diameter of an outermost second worm shaft enveloping gear tooth among the second worm shaft enveloping gear teeth is larger than an external diameter of an outermost second worm shaft cylindrical gear tooth among the second worm shaft cylindrical gear teeth.

11. The actuator of claim 1, wherein an entire cross-sectional shape of the second worm shaft gear teeth is a half double-headed drum shape.

12. The actuator of claim 1, wherein the second worm shaft enveloping gear teeth are spaced apart from the second worm shaft cylindrical gear teeth.

13. An actuator for a vehicle brake, comprising:

a housing;

a first worm shaft connected to a motor and disposed within the housing;

a first worm wheel disposed within the housing, engaged with the first worm shaft, and rotated in conjunction with a rotation of the first worm shaft;

a second worm shaft comprising:

a second worm shaft body disposed within the housing and connected to the first worm wheel, and a plurality of second worm shaft gear teeth disposed on an outer circumference of the second worm shaft body in a way to be spaced apart from each other, the plurality of second worm shaft gear teeth comprising:

second worm shaft enveloping gear teeth, each having an external diameter that is increased from a worm shaft central part of the second worm shaft body toward a first end of the second worm shaft body, and second worm shaft cylindrical gear teeth, each having a constant external diameter from the worm shaft central part to a second end which is a side opposite to the first end in a longitudinal axis of the second worm shaft body, and wherein a portion of the second worm shaft including the second worm shaft enveloping gear teeth has a shape of a globoid worm shaft; and a single second worm wheel, wherein the second worm wheel is engaged with the second worm shaft and configured to deliver electric power to a piston part that pressurizes or releases a brake, wherein the second worm wheel comprises:

a second worm wheel body rotatably installed in the housing; and a plurality of second worm wheel gear teeth disposed along an outer circumference of the second worm wheel body in a way to be spaced apart from each other, the plurality of second worm wheel gear teeth comprising:

a second worm wheel enveloping gear tooth comprising a second worm wheel inclined part having a protrusion height increased from a central part of second worm wheel gear tooth among the plurality of second worm wheel gear teeth toward a first end of the second worm wheel gear tooth, and a second worm wheel cylindrical gear tooth having a constant protrusion height from the central part to a second end of the second worm wheel gear tooth, wherein, when the second worm wheel rotates in a direction in which braking power is generated, the second worm shaft enveloping gear teeth are disposed on the second worm shaft body on a side in which a force is applied to the second worm wheel and closer to the second worm wheel, and the second worm shaft cylindrical gear teeth are disposed on an opposite side of the second worm shaft body.

14. The actuator of claim 13, further comprising a bearing disposed within the housing and configured to support a rotation of the second worm shaft.

15. The actuator of claim 14, wherein:

at least one of the second worm shaft enveloping gear teeth is disposed closer to the first worm wheel than at least one of the second worm shaft cylindrical gear teeth, and the bearing is disposed between the first worm wheel and the at least one of the second worm shaft enveloping gear teeth.

16. The actuator of claim 14, wherein:

at least one of the second worm shaft enveloping gear teeth is disposed further from the first worm wheel than at least one of the second worm shaft cylindrical gear teeth, and the bearing is disposed further from the first worm wheel than from the at least one of the second worm shaft enveloping gear teeth.

* * * * *